United States Patent
Matsushima et al.

(10) Patent No.: US 10,061,168 B2
(45) Date of Patent: Aug. 28, 2018

(54) LIQUID CRYSTAL DISPLAY DEVICE

(71) Applicant: Japan Display Inc., Tokyo (JP)

(72) Inventors: Toshiharu Matsushima, Tokyo (JP); Keiji Takizawa, Tokyo (JP); Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/703,306

(22) Filed: Sep. 13, 2017

(65) Prior Publication Data

US 2018/0004050 A1 Jan. 4, 2018

Related U.S. Application Data

(63) Continuation of application No. 14/754,185, filed on Jun. 29, 2015, now Pat. No. 9,785,021.

(30) Foreign Application Priority Data

Jun. 30, 2014 (JP) ................... 2014-134980
Jun. 17, 2015 (JP) ................... 2015-122001

(51) Int. Cl.
*G02F 1/1343* (2006.01)
*G02F 1/1335* (2006.01)

(52) U.S. Cl.
CPC .. *G02F 1/134363* (2013.01); *G02F 1/133514* (2013.01); *G02F 2001/134345* (2013.01)

(58) Field of Classification Search
CPC ............ G02F 1/134363; G02F 1/133514
See application file for complete search history.

(56) References Cited

U.S. PATENT DOCUMENTS

| | | | |
|---|---|---|---|
| 7,768,597 B2 * | 8/2010 | Chang | G02F 1/134363 349/106 |
| 2004/0257514 A1 | 12/2004 | Hsieh | |
| 2010/0066952 A1 * | 3/2010 | Tsuchiya | G02F 1/133514 349/106 |
| 2013/0100388 A1 | 4/2013 | Matsushima | |
| 2014/0092353 A1 | 4/2014 | Matsushima | |
| 2014/0118639 A1 | 5/2014 | Matsushima | |
| 2014/0293175 A1 | 10/2014 | Tamaki et al. | |

(Continued)

FOREIGN PATENT DOCUMENTS

JP 2008-052161 3/2008
JP 2010-145825 7/2010

(Continued)

*Primary Examiner* — James Dudek
(74) *Attorney, Agent, or Firm* — K&L Gates LLP

(57) ABSTRACT

According to an aspect, a liquid crystal display device includes: a first substrate; a second substrate; a liquid crystal layer between the first and second substrates; pixels each including sub-pixels corresponding to different color areas; a first electrode in each sub-pixel; and a second electrode facing the first electrode. The first electrode includes an electrode base portion extending in a first direction; and a plurality of comb tooth portions extending in a second direction from the electrode base portion. A slit pitch of a sub-pixel in one color area and a slit pitch of a sub-pixel in the other color area of at least two color areas out of different color areas are different in size, each slit pitch corresponding to a gap between the comb tooth portions adjacent to each other.

13 Claims, 19 Drawing Sheets

(56) References Cited

U.S. PATENT DOCUMENTS

2014/0293176 A1 10/2014 Tamaki et al.
2014/0293177 A1 10/2014 Matsushima
2014/0307212 A1 10/2014 Oka et al.
2014/0320791 A1 10/2014 Oiwa et al.
2014/0354931 A1 12/2014 Kurasawa

FOREIGN PATENT DOCUMENTS

| | | |
|---|---|---|
| JP | 2013-109309 | 6/2013 |
| JP | 2014-206639 | 10/2014 |
| JP | 2014-209212 | 11/2014 |
| JP | 2014-209213 | 11/2014 |
| JP | 2014-209228 | 11/2014 |
| JP | 2014-215444 | 11/2014 |
| JP | 2014-232136 | 12/2014 |

\* cited by examiner though this application is a continuation application of
U.S. patent application Ser. No. 14/754,185, filed on Jun. 29,
2015, which application claims priority to Japanese Priority
Patent Application JP 2014-134980 filed in the Japan Patent
Office on Jun. 30, 2014, and JP 2015-122001 filed in the
Japan Patent Office on Jun. 17, 2015, the entire content of
which is hereby incorporated by reference.

BACKGROUND

1. Technical Field

The present invention relates to a liquid crystal display
device provided with liquid crystals and to an electronic
apparatus including the liquid crystal display device provided with liquid crystals.

2. Description of the Related Art

There have been developed systems (modes) for driving
liquid crystals, including a liquid crystal driving system that
uses an electric field generated in a longitudinal direction
between substrates, that is, a longitudinal electric field.
Examples of a liquid crystal display device that drives liquid
crystals using a longitudinal electric field include, but are not
limited to, longitudinal-electric-field liquid crystal display
devices provided with a twisted nematic (TN) system, a
vertical alignment (VA) system, an electrically controlled
birefringence (ECB) system, etc. As disclosed in Japanese
Patent Application Laid-open Publication No. 2008-52161
(JP-A-2008-52161), there has also been developed a liquid
crystal driving system that uses an electric field generated in
a direction parallel to substrates (lateral direction), that is, a
lateral electric field. Examples of a liquid crystal display
device that drives liquid crystals using a lateral electric field
include, but are not limited to, lateral-electric-field liquid
crystal display devices provided with a fringe field switching
(FFS) system, an in-plane switching (IPS) system, etc.

In the IPS mode, a first electrode and a second electrode
are provided on the same layer, and an electric field is
generated mainly in a direction parallel to the substrate
surface. This configuration makes the electric field unlikely
to be generated in an area on the first electrode, thereby
making liquid crystal molecules in the area unlikely to be
driven.

In the FFS mode, a pixel electrode and a common
electrode overlap in a direction perpendicular to the substrate surface with a dielectric film interposed therebetween.
This configuration generates an electric field extending
mainly in a direction oblique to the substrate surface or a
parabolic electric field (also referred to as a fringe electric
field). As a result, liquid crystal molecules in an area on the
pixel electrode are likely to be driven. In other words, the
FFS mode can provide a higher aperture ratio than the IPS
mode does.

The lateral-electric-field liquid crystal display device generates an electric field between the first electrode and the
second electrode in a direction parallel to the substrate,
thereby rotating the liquid crystal molecules in a plane
parallel to the substrate surface. The liquid crystal display
device performs display using a change in the light transmittance corresponding to the rotation of the liquid crystal
molecules. Such lateral-electric-field liquid crystal display
devices are required to increase the response speed of the
liquid crystals.

Japanese Patent Application Laid-open Publication No.
2010-145825 describes the fact that the response speed of
liquid crystals varies depending on the thickness of a liquid
crystal layer and describes a liquid crystal display device in
a VA mode that can prevent coloration by equalizing the
response speeds of respective colors. Japanese Patent Application Laid-open Publication No. 2013-109309 (JP-A-2013-
109309) describes a liquid crystal display device having a
higher response speed of liquid crystals than that of the
liquid crystal display device described in JP-A-2008-52161.

The inventors found that, while the liquid crystal display
device described in JP-A-2013-109309 can increase the
response speed of liquid crystals in a pixel as a whole, it is
necessary to stabilize the orientation of the liquid crystals in
respective sub-pixels corresponding to a plurality of different color areas.

For the foregoing reasons, there is a need for a liquid
crystal display device that can achieve a higher response
speed of the entire pixel and higher orientation stability in
each sub-pixel to improve display quality in a display
surface.

SUMMARY

According to an aspect, a liquid crystal display device
includes a first substrate; a second substrate arranged facing
the first substrate; a liquid crystal layer arranged between the
first substrate and the second substrate; a plurality of pixels
arranged in a matrix and each including sub-pixels corresponding to a plurality of different color areas; a first
electrode arranged in each of the sub-pixels; and a second
electrode arranged at a portion facing the first electrode. The
first electrode includes an electrode base portion extending
in a first direction; and a plurality of comb tooth portions
extending in a second direction different from the first
direction from the electrode base portion with a certain gap
interposed therebetween. A slit pitch of a sub-pixel in one
color area and a slit pitch of a sub-pixel in the other color
area of at least two color areas out of the different color areas
are different in size, each slit pitch corresponding to a gap
between the comb tooth portions adjacent to each other.

Additional features and advantages are described herein,
and will be apparent from the following Detailed Description and the figures.

DETAILED DESCRIPTION

Figure 1:
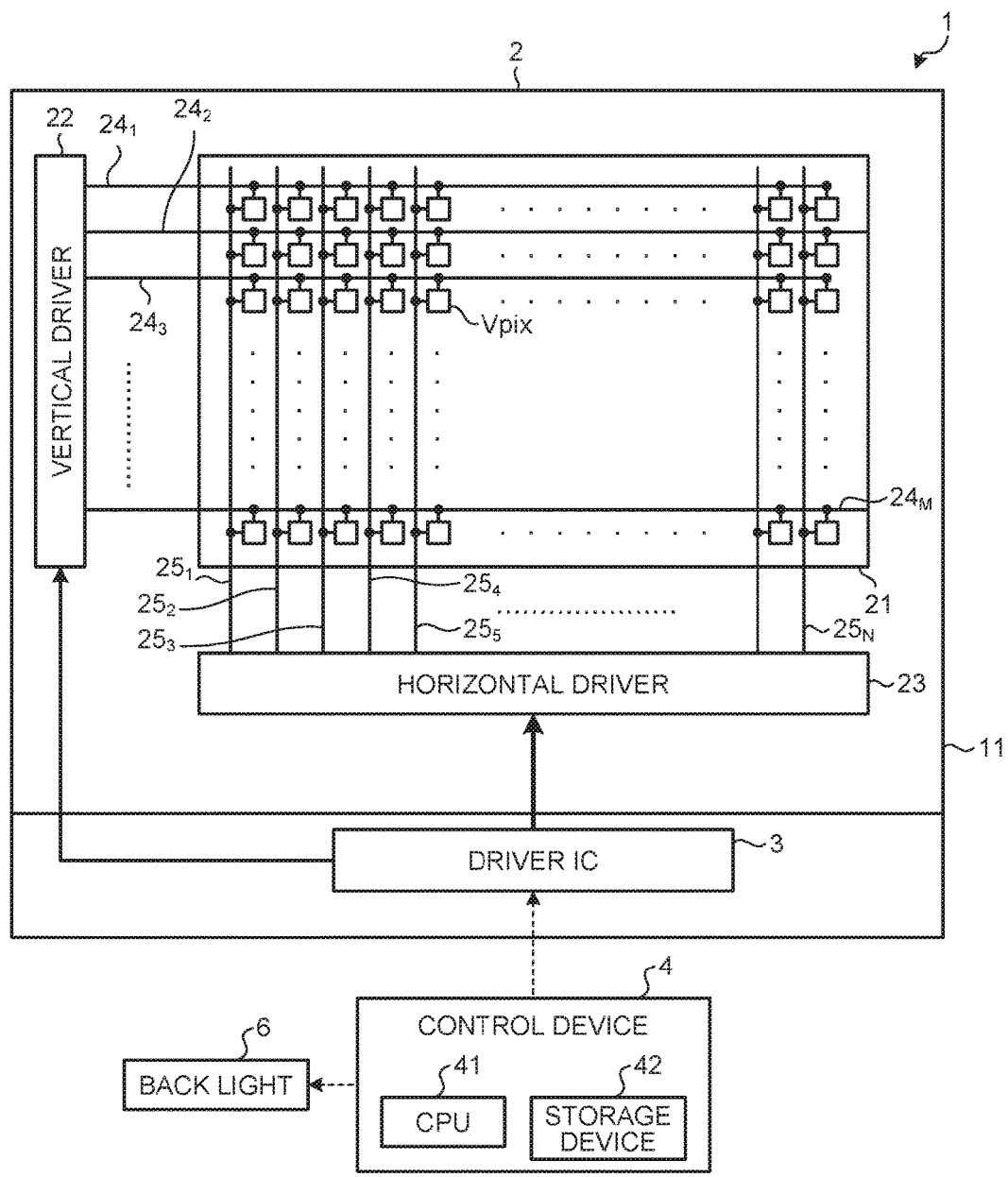
FIG. 1 is a block diagram of an exemplary system
configuration of a liquid crystal display device according to
a first embodiment of the present disclosure.

Exemplary aspects (embodiments) according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only. Various changes and modifications made without departing from the spirit of the invention and easily conceivable by those skilled in the art are naturally included in the scope of the invention. The drawings may possibly illustrate the width, the thickness, the shape, and the like of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will be appropriately omitted.

First Embodiment

FIG. 1 is a block diagram of an exemplary system configuration of a liquid crystal display device according to a first embodiment of the present disclosure. A liquid crystal display device 1 is a transmissive liquid crystal display device and includes a display panel 2 and a driver integrated circuit (IC) 3. Flexible printed circuits (FPCs), which are not illustrated, transmit an external signal to the driver IC 3 or driving electric power to drive the driver IC 3. The display panel 2 includes a translucent insulation substrate such as a glass substrate 11, a display area 21, a vertical driver (vertical drive circuit) 22, and a horizontal driver (horizontal drive circuit) 23. The display area 21 is provided on the surface of the glass substrate 11 and has a number of pixels each including a liquid crystal cell and arranged in a matrix (rows and columns). The glass substrate 11 includes a first substrate and a second substrate. The first substrate is provided with a number of pixel circuits each including an active element (e.g., a transistor) and arranged in a matrix. The second substrate is arranged facing the first substrate with a predetermined gap interposed therebetween. The gap between the first substrate and the second substrate is maintained at a predetermined gap by photo spacers arranged at respective positions on the first substrate. The space between the first substrate and the second substrate is sealed with liquid crystals.

Exemplary System Configuration of the Liquid Crystal Display Device

The display panel 2 includes the display area 21, the driver IC 3 having functions of an interface (I/F) and a timing generator, the vertical driver 22, and the horizontal driver 23 on the glass substrate 11.

The display area 21 has a matrix (row-and-column) structure in which M×N units each serving as one pixel on display are arranged. In the present specification, a row indicates a pixel row including N sub-pixels Vpix arrayed in a direction. A column indicates a pixel column including M sub-pixels Vpix arrayed in a direction orthogonal to the direction in which the sub-pixels Vpix included in the row are arrayed. The values of M and N are determined depending on display resolution in the vertical direction and that in the horizontal direction, respectively. The display area 21 has scanning lines $24_1, 24_2, 24_3, \ldots, 24_M$ arranged for each row of the array of M×N sub-pixels Vpix, and signal lines $25_1, 25_2, 25_3, \ldots, 25_N$ arranged for each column of the array of M×N sub-pixels Vpix. In the present embodiment, the scanning lines $24_1, 24_2, 24_3, \ldots, 24_M$ may be collectively referred to as a scanning line 24, whereas the signal lines $25_1, 25_2, 25_3, \ldots, 25_N$ may be collectively referred to as a signal line 25. In the present embodiment, optional three scanning lines out of the scanning lines $24_1, 24_2, 24_3, \ldots$, $24_M$ are referred to as scanning line $24_m$, $24_{m+1}$, and $24_{m+2}$ (where m is a natural number satisfying m≤M−2), whereas optional three signal lines out of the signal lines $25_1$, $25_2$, $25_3$, ..., $25_N$ are referred to as scanning line $25_n$, $25_{n+1}$, and $25_{n+2}$ (where n is a natural number satisfying n≤N−2).

The liquid crystal display device 1 receives a master clock, a horizontal synchronizing signal, and a vertical synchronizing signal, which are external signals from the outside. These signals are supplied to the driver IC 3. The driver IC 3 converts the level of the master clock, the horizontal synchronizing signal, and the vertical synchronizing signal at a voltage amplitude of an external power source into a level at a voltage amplitude of an internal power source required to drive the liquid crystals. Thus, the driver IC 3 generates a master clock, a horizontal synchronizing signal, and a vertical synchronizing signal. The driver IC 3 supplies the generated master clock to the vertical driver 22 and the horizontal driver 23, the generated vertical synchronizing signal to the vertical driver 22, and the generated horizontal synchronizing signal to the horizontal driver 23. The driver IC 3 generates a common potential to be supplied to pixels in common by a common electrode COM, which will be described later, of each sub-pixel Vpix and supplies the common potential to the display area 21.

The vertical driver 22 sequentially samples and latches, in one horizontal period, display data output from the driver IC 3 in synchronization with a vertical clock pulse. The vertical driver 22 sequentially outputs and supplies the latched digital data of one line as a vertical scanning pulse to the scanning lines $24_m$, $24_{m+1}$, $24_{m+2}$, ... of the display area 21. Thus, the vertical driver 22 sequentially selects sub-pixels Vpix row by row. The vertical driver 22, for example, outputs the digital data to the scanning lines $24_m$, $24_{m+1}$, $24_{m+2}$, ... from the top of the display area 21, that is, the upper side in the vertical scanning, to the bottom of the display area 21, that is, the lower side in the vertical scanning in order. Alternatively, the vertical driver 22 may output the digital data to the scanning lines $24_m$, $24_{m+1}$, $24_{m+2}$, ... from the bottom of the display area 21, that is, the lower side in the vertical scanning, to the top of the display area 21, that is, the upper side in the vertical scanning in order.

The horizontal driver 23 is supplied with 6-bit digital video data Vsig of R (red), G (green), and B (blue), for example. The horizontal driver 23 writes, via the signal line 25, display data to the sub-pixels Vpix of the row selected in the vertical scanning performed by the vertical driver 22 in units of a pixel, in units of a plurality of pixels, or in one unit of all the pixels.

In the liquid crystal display device 1, continuous application of a direct current (DC) voltage of the same polarity to the liquid crystal elements may possibly deteriorate resistivity (substance-specific resistance) and the like of the liquid crystals. To prevent deterioration in the resistivity (substance-specific resistance) and the like of the liquid crystals, the liquid crystal display device 1 employs a driving method for reversing the polarity of video signals at a predetermined period based on the common potential of drive signals.

Some types of methods for driving a liquid crystal display panel are known, including line inversion, dot inversion, and frame inversion driving methods. The line inversion driving method is a method for reversing the polarity of video signals at a time period of 1H (H represents a horizontal period) corresponding to one line (one pixel row). The dot inversion driving method is a method for alternately reversing the polarity of video signals for pixels vertically and horizontally adjacent to each other. The frame inversion driving method is a method for reversing the polarity of video signals to be written to all the pixels in one frame corresponding to one screen with the same polarity at a time. The liquid crystal display device 1 may employ any one of the driving methods described above.

Figure 2:
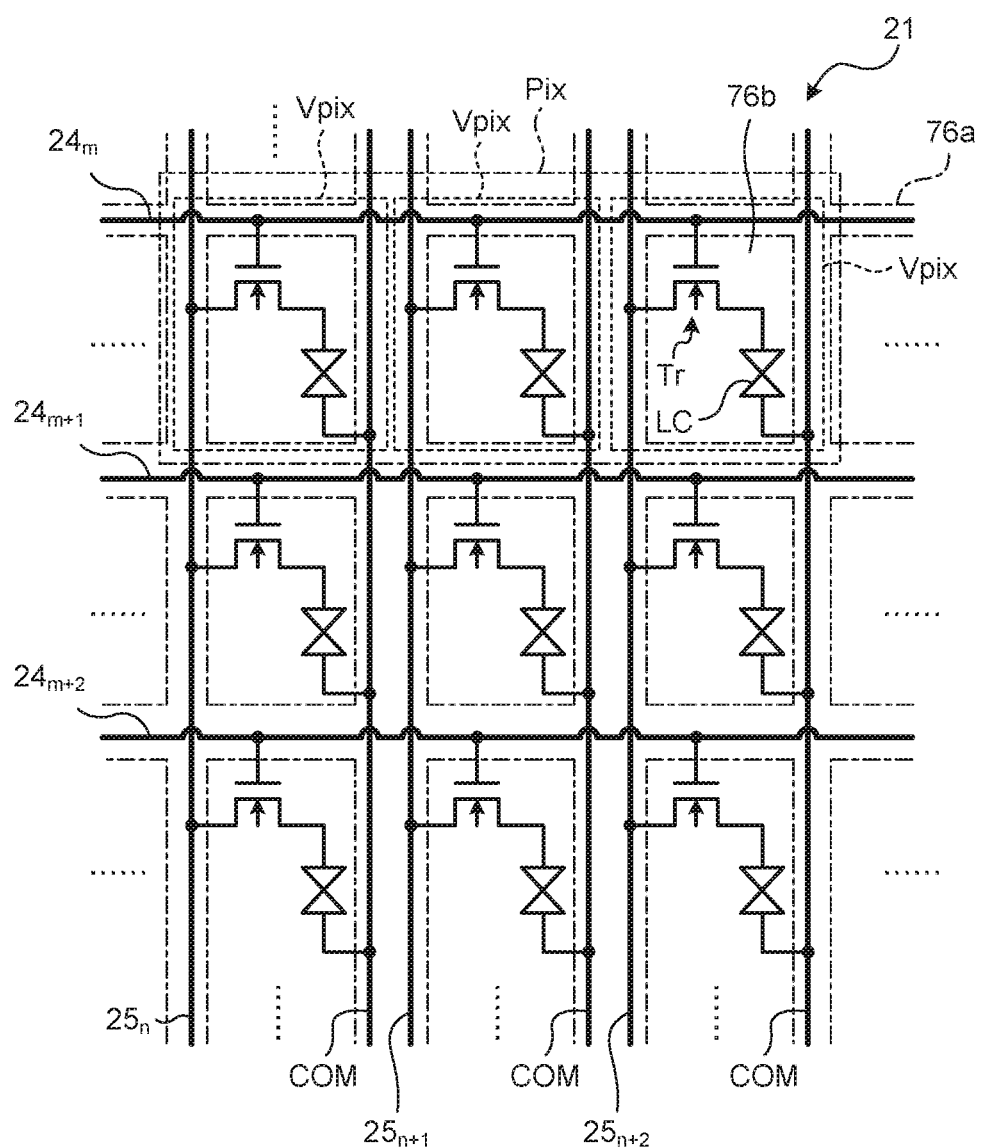
FIG. 2 is a circuit diagram of a drive circuit that drives
pixels of the liquid crystal display device according to the
first embodiment.

FIG. 2 is a circuit diagram of a drive circuit that drives the pixels of the liquid crystal display device according to the first embodiment. In the display area 21, wiring of the signal lines $25_n$, $25_{n+1}$, $25_{n+2}$ and the scanning lines $24_m$, $24_{m+1}$, $24_{m+2}$ are formed, for example. The signal lines $25_n$, $25_{n+1}$, $25_{n+2}$ supply pixel signals serving as display data to thin film transistor (TFT) elements Tr in respective sub-pixels Vpix. The scanning lines $24_m$, $24_{m+1}$, $24_{m+2}$ drive the TFT elements Tr. The signal lines $25_n$, $25_{n+1}$, $25_{n+2}$ extend on a plane parallel to the surface of the glass substrate 11 and supply the pixel signals to display an image to the sub-pixels Vpix. The sub-pixels Vpix each include the TFT element Tr and a liquid crystal capacitor LC. The TFT element Tr is made of a TFT, and specifically of an n-channel metal oxide semiconductor (MOS) TFT in this example. One of the source and the drain of the TFT element Tr is coupled to the corresponding one of the signal lines $25_n$, $25_{n+1}$, $25_{n+2}$, the gate thereof is coupled to the corresponding one of the scanning lines $24_m$, $24_{m+1}$, $24_{m+2}$, and the other of the source and the drain thereof is coupled to one end of the liquid crystal capacitor LC. The one end of the liquid crystal capacitor LC is coupled to the other of the source and the drain of the TFT element Tr, and the other end of the liquid crystal capacitor LC is coupled to the corresponding common electrode COM.

The sub-pixel Vpix is coupled to other sub-pixels Vpix belonging to the same row in the display area 21 by the corresponding one of the scanning lines $24_m$, $24_{m+1}$, $24_{m+2}$. The scanning lines $24_m$, $24_{m+1}$, $24_{m+2}$ are coupled to the vertical driver 22 and are supplied with the vertical scanning pulses of scanning signals from the vertical driver 22. The sub-pixel Vpix is further coupled to other sub-pixels Vpix belonging to the same column in the display area 21 by the corresponding one of the signal lines $25_n$, $25_{n+1}$, $25_{n+2}$. The signal lines $25_n$, $25_{n+1}$, $25_{n+2}$ are coupled to the horizontal driver 23 and are supplied with pixel signals from the horizontal driver 23. The sub-pixel Vpix is further coupled to the other sub-pixels Vpix belonging to the same column in the display area 21 by the corresponding common electrode COM. The common electrodes COM are coupled to the driver IC 3 and are supplied with drive signals from the driver IC 3.

The vertical driver 22 illustrated in FIG. 1 applies vertical scanning pulses to the gate of the TFT element Tr of sub-pixels Vpix through the scanning lines $24_m$, $24_{m+1}$, $24_{m+2}$ illustrated in FIG. 2. Thus, the vertical driver 22 sequentially selects a row (a horizontal line) out of the rows of the sub-pixels Vpix arranged in a matrix in the display area 21 as a target of display drive. The horizontal driver 23 illustrated in FIG. 1 supplies pixel signals to the respective sub-pixels Vpix included in each horizontal line sequentially selected by the vertical driver 22 through the corresponding one of the signal lines $25_n$, $25_{n+1}$, $25_{n+2}$ illustrated in FIG. 2. These sub-pixels Vpix perform display of the horizontal line based on the supplied pixel signals. The driver IC 3 applies drive signals, thereby driving the common electrodes COM in each drive electrode block including a predetermined number of common electrodes COM.

As described above, the vertical driver 22 in the liquid crystal display device 1 drives to sequentially scan the scanning lines $24_m$, $24_{m+1}$, $24_{m+2}$, thereby sequentially selecting a horizontal line. The horizontal driver 23 in the liquid crystal display device 1 supplies the pixel signals to the sub-pixels Vpix belonging to the horizontal line, thereby performing display of the horizontal line. To perform the display operation, the driver IC 3 applies the drive signals to the common electrodes COM corresponding to the horizontal line.

A control device 4 includes a central processing unit (CPU) 41 serving as an arithmetic device and a storage device 42 serving as a memory. The control device 4 executes computer programs using the hardware resources, thereby carrying out various functions. Specifically, the control device 4 reads a computer program stored in the storage device 42, loads it in the memory, and causes the CPU 41 to execute an instruction contained in the loaded computer program. Based on the execution result of the instruction carried out by the CPU 41, the control device 4 performs control such that the driver IC 3 can treat an image to be displayed on the display panel 2 as information on a gradation for inputting the image. A back light 6 outputs light to the display panel 2 in response to a control signal received from the control device 4, thereby making the light incident on the whole surface of the display area 21. The back light 6 includes a light source and a light guide plate that guides light output from the light source and makes it incident on the back surface of the display panel 2. The back light 6 may include a plurality of light sources aligned in a direction along a side of the display area 21 and the amount of light of each light source may be controlled individually. This configuration enables the back light 6 to make light output from only a part of the light sources incident on a part of the display panel 2. While the light source in the liquid crystal display device 1 according to the present embodiment is the back light 6 arranged on the back side of the display panel 2, it may be a front light arranged on the front side of the display panel 2.

The display area 21 includes a color filter. The color filter includes a grid-shaped black matrix 76a and apertures 76b. The black matrix 76a is formed to cover the outer periphery of the sub-pixel Vpix as illustrated in FIG. 2. In other words, the black matrix 76a is arranged at a boundary between the two-dimensionally arranged sub-pixels Vpix and thus is formed into a grid shape. The black matrix 76a is made of a material having a high light-absorption rate. The apertures 76b each serve as an aperture formed by the grid shape of the black matrix 76a and are arranged at positions corresponding to the respective sub-pixels Vpix.

The aperture 76b includes color areas colored with three colors of R, G, and B, for example. In the color filter, the color areas of the color filter in the three colors of R, G, and B are periodically arrayed on the respective apertures 76b, for example. Thus, the color areas in the three colors of R, G, and B correspond to the respective sub-pixels Vpix illustrated in FIG. 2, thereby serving as a pixel Pix as a set.

The color filter may be a combination of other colors as long as it is colored with difference colors. Typically, the luminance of the color area of G is higher than that of the color areas of R and B. A color other than R, G, and B may be added. Examples of the added color include, but are not limited to, white (W), etc. No color filter may be provided for the sub-pixel of W. The sub-pixel provided with no color filter produces a white color. Alternatively, a transmissive resin may be used as the color filter, thereby producing a white color.

Alternatively, a color other than white, such as yellow, may be used as the added color. In a case where yellow is used as the added color, the color filter simply needs to be colored with yellow.

Viewed in a direction orthogonal to the front surface of the display area 21, the scanning line 24 and the signal line 25 are arranged in an area overlapping with the black matrix 76a of the color filter. In other words, the scanning line 24 and the signal line 25 are hidden behind the black matrix 76a viewed in a direction orthogonal to the front surface. In the display area 21, an area provided with no black matrix 76a corresponds to the aperture 76b.

As illustrated in FIG. 2, the scanning lines $24_m$, $24_{m+1}$, $24_{m+2}$ are arranged at regular intervals, and the signal lines $25_n$, $25_{n+1}$, $25_{n+2}$ are also arranged at regular intervals. The sub-pixels Vpix are arranged facing in the same direction at the respective areas sectioned by the adjacent scanning lines $24_m$, $24_{m+1}$, $24_{m+2}$ and the adjacent signal lines $25_n$, $25_{n+1}$, $25_{n+2}$.

Figure 3:
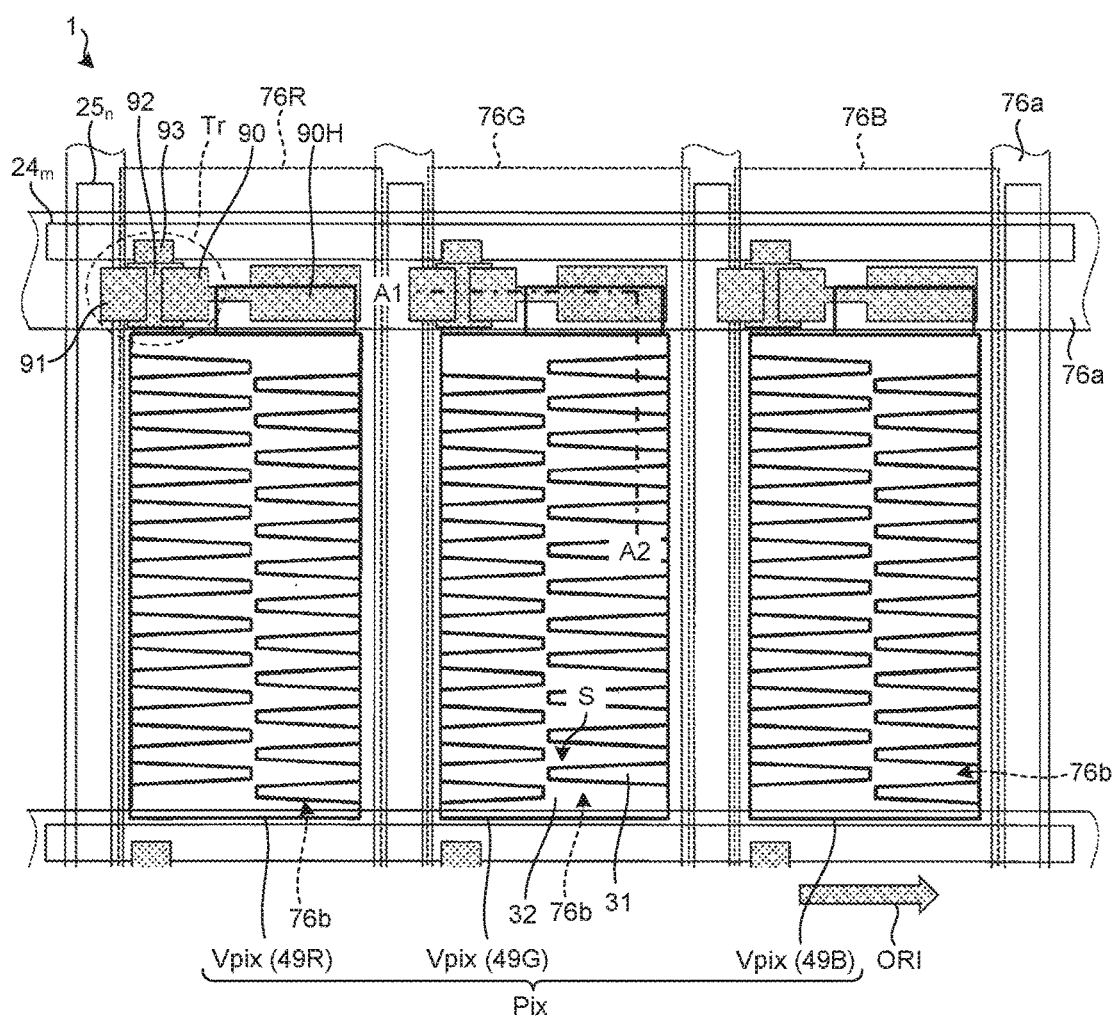
FIG. 3 is a plan view for explaining a pixel of the liquid
crystal display device according to the first embodiment.
Figure 4:
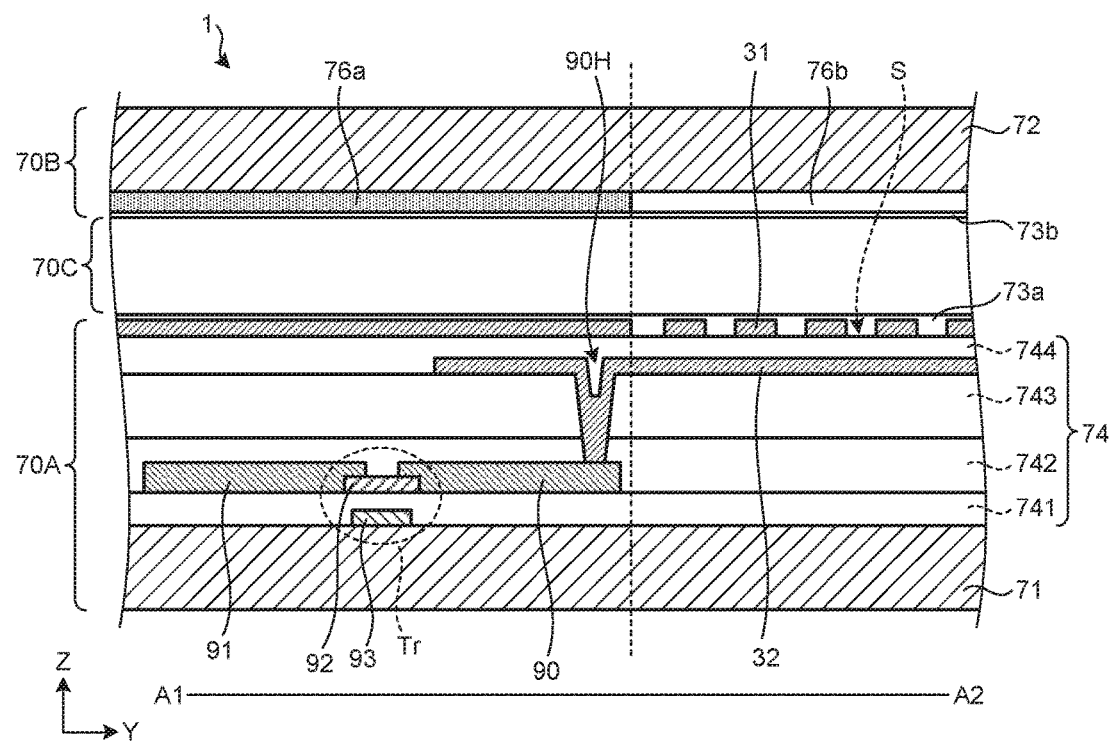
FIG. 4 is a schematic view of a section along line A1-A2
in FIG. 3.

FIG. 3 is a plan view for explaining a pixel of the liquid crystal display device according to the first embodiment. FIG. 4 is a schematic view of a section along line A1-A2 in FIG. 3. In FIGS. 3 and 4, an X-direction is a direction on a plane of the liquid crystal display device 1 (display panel 2 in FIG. 1) according to the first embodiment, a Y-direction is a direction orthogonal to the X-direction, and a Z-direction is a direction orthogonal to the X-Y plane. In each sub-pixel Vpix, the aperture 76b is formed on the lower side in the vertical scanning (lower side in FIG. 3). The TFT element Tr is arranged on the left on the upper side in the vertical scanning (upper side in FIG. 3). A contact 90H is formed on the right on the upper side in the vertical scanning (upper side in FIG. 3). The contact 90H is used to couple a pixel electrode to the drain electrode of the TFT element Tr. The drain of the TFT electrode Tr includes a part of a semiconductor layer (active layer) and a drain electrode 90. Similarly, the source of the TFT electrode Tr includes another part of the semiconductor layer (active layer) and a source electrode 91. Color filters 76R, 76G, and 76B are formed by periodically arraying the color areas of the color filters in the three colors of R, G, and B on the respective apertures 76b, for example. Thus, the color areas in the three colors of R, G, and B are formed in the respective sub-pixels Vpix illustrated in FIG. 2.

As illustrated in FIG. 4, the liquid crystal display device 1 includes a pixel substrate (first substrate) 70A, a counter substrate (second substrate) 70B, and a liquid crystal layer 70C. The counter substrate 70B is arranged facing the surface of the pixel substrate 70A in a perpendicular direction. The liquid crystal layer 70C is inserted between the pixel substrate 70A and the counter substrate 70B. The surface of the pixel substrate 70A on the side opposite to the liquid crystal layer 70C side is provided with the back light 6. Photo spacers (not illustrated) maintain the gap between the pixel substrate 70A and the counter substrate 70B at a predetermined gap.

In the liquid crystal layer 70C according to the first embodiment, an electric field (lateral electric field) is generated, in a direction parallel to the TFT substrate 71, between a first electrode 31 and a second electrode 32 laminated in a direction (Z-direction) perpendicular to the surface of a TFT substrate 71 of the pixel substrate 70A. The electric field rotates the liquid crystal molecules in the liquid crystal layer 70C in a plane parallel to the substrate surface. The liquid crystal display device 1 uses a change in the light transmittance corresponding to the rotation of the liquid crystal molecules, thereby performing display. The second electrode 32 illustrated in FIG. 4 corresponds to the pixel electrode, whereas the first electrode 31 corresponds to the common electrode COM, for example. As illustrated in FIG. 4, a first orientation film 73a is provided between the liquid crystal layer 70C and the pixel substrate 70A, whereas a second orientation film 73b is provided between the liquid crystal layer 70C and the counter substrate 70B.

The counter substrate 70B includes a glass substrate 72 and the light-blocking black matrix 76a formed on one surface of the glass substrate 72. The black matrix 76a faces the liquid crystal layer 70C in a direction perpendicular to the pixel substrate 70A.

The pixel substrate 70A includes the TFT substrate 71 serving as a circuit substrate. The scanning line $24_m$ illustrated in FIG. 3 is formed on the TFT substrate 71. A gate electrode 93 is electrically coupled to the scanning line $24_m$. While the scanning line $24_m$ and the gate electrode 93 are formed in difference layers in FIGS. 3 and 4, the scanning line $24_m$ and the gate electrode 93 may be integrally formed.

A semiconductor layer 92 containing amorphous silicon (a-Si) and forming the TFT element Tr is formed in an upper layer of the gate electrode 93. The semiconductor layer 92 is coupled to the source electrode 91 forming the TFT element Tr. The source electrode 91 is an electric conductor and is electrically coupled to a part of the semiconductor layer 92. The source electrode 91 is electrically coupled to the signal line $25_n$ illustrated in FIG. 3 (not illustrated in FIG. 4). The semiconductor layer 92 is coupled to the drain electrode 90 forming the TFT element Tr. The drain electrode 90 is electrically coupled to another part of the semiconductor layer 92. While the signal line $25_n$ and the source electrode 91 are formed in difference layers in FIG. 3, the signal line $25_n$ and the source electrode 91 may be integrally formed.

An insulation layer 74 is formed of laminated insulation films, which are an insulation film 741 between the scanning line $24_m$ and the semiconductor layer 92, an insulation film 742 between the semiconductor layer 92 and the signal line $25_n$, an insulation film 743 between the signal line $25_n$ and the second electrode 32, and an insulation film 744 between the second electrode 32 and the first electrode 31, for example. The insulation films 741, 742, 743, and 744 may be made of the same insulation material, or any one thereof may be made of a different insulation material. For example, the insulation film 743 is made of an organic insulation material such as a polyimide resin and the other insulation films (insulation films 741, 742, and 744) are made of an inorganic insulation material such as silicon nitride and silicon oxide.

The contact 90H made of a conductive metal is formed in what is called a contact hole. The contact 90H couples the drain electrode 90 and the second electrode 32. The first electrode 31 serves as the common electrode COM and is supplied with a common potential to be supplied to the pixels in common. The first electrode 31 and the second electrode 32 are translucent electrodes made of a translucent conductive material (a translucent conductive oxide) such as indium tin oxide (ITO).

Figure 5:
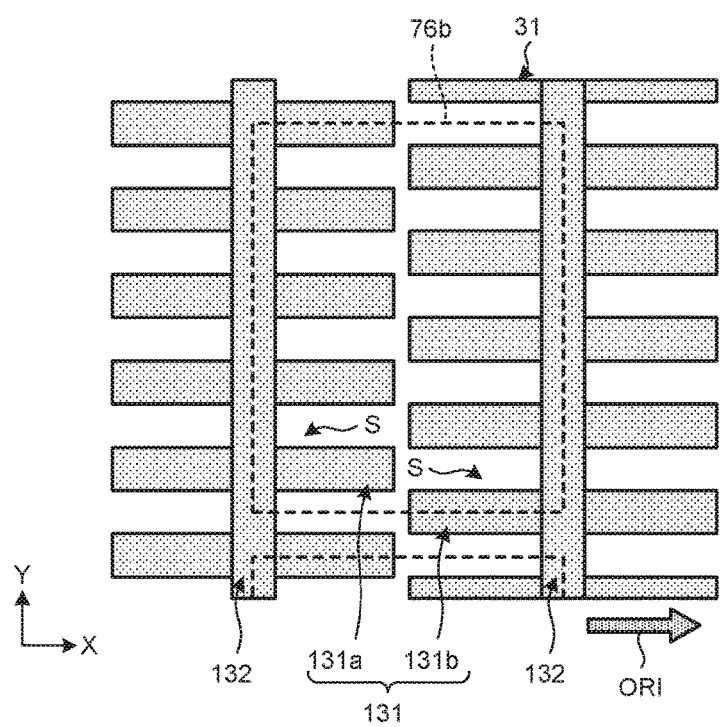
FIG. 5 is a schematic view for explaining the relation
between the shape of a first electrode and an aperture
according to the first embodiment.

FIG. 5 is a schematic view for explaining the relation between the shape of the first electrode and the aperture according to the first embodiment. As illustrated in FIG. 5, the first electrode 31 has a comb teeth shape formed by slits S, which are areas with no conductive material provided. The first electrode 31 includes a plurality of comb tooth portions 131 protruding from an electrode base portion 132 extending in the Y-direction. The comb tooth portions 131 include comb tooth portions 131a and comb tooth portions 131b extending in opposite directions from the electrode base portion 132. The comb tooth portions 131a protrude from the electrode base portion 132 with a certain distance interposed therebetween. Similarly, the comb tooth portions 131b protrude from the electrode base portion 132 with a certain distance interposed therebetween. The electrode base portion 132 has the comb tooth portions 131a extending in the X-direction and the comb tooth portions 131b extending in a direction opposite to the X-direction. Similarly to the comb tooth portions 131a or the comb tooth portions 131b, the electrode base portion 132 is made of a translucent conductive material (translucent conductive oxide) such as ITO.

The first orientation film 73a is subjected to orientation processing in an orientation direction ORI (first orientation direction) illustrated in FIGS. 3 and 5 such that the liquid crystal molecules have predetermined initial orientation in the X-direction. The second orientation film 73b is subjected to orientation processing in a direction (second orientation direction) antiparallel to the orientation direction ORI of the first orientation film 73a. The orientation directions of the first orientation film 73a and the second orientation film 73b are antiparallel to each other. As described above, the comb tooth portions 131a extend in the X-direction, and the comb tooth portions 131b extend in the direction opposite to the X-direction. The orientation direction ORI is parallel to the direction in which the comb tooth portions 131a and the comb tooth portions 131b extend. The orientation direction ORI simply needs to be parallel enough to maintain the rotation direction of liquid crystal molecules Lcm, which will be described later, illustrated in FIG. 9. More specifically, the orientation direction ORI allows a manufacturing error of 0 degrees to 0.5 degrees. To provide predetermined orientation to the liquid crystal molecules, the following orientation film may be used: an orientation film formed by performing rubbing on an organic film such as a polyimide; or an optical orientation film that can be provided with a specific liquid crystal orientation capability by irradiating the film with light such as ultraviolet rays. As described above, the first orientation film 73a and the second orientation film 73b according to the first embodiment are subjected to rubbing so as to have the predetermined initial orientation. The first orientation film 73a and the second orientation film 73b, however, are not necessarily subjected to rubbing to have the predetermined initial orientation. The first orientation film 73a and the second orientation film 73b may be made of an optically oriented material, thereby having the predetermined initial orientation.

Figure 6:
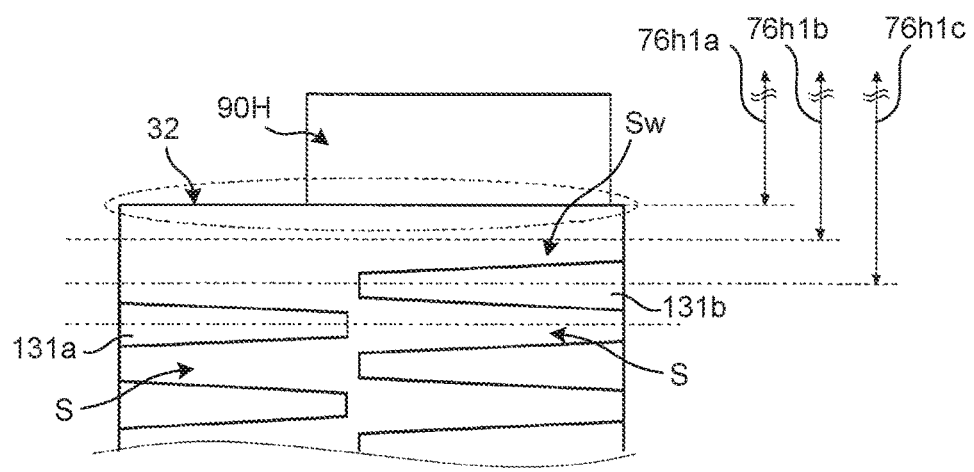
FIG. 6 is a schematic view for explaining the relation
between the shape of the first electrode and a shaded position
according to the first embodiment.

FIG. 6 is a schematic view for explaining the relation between the shape of the first electrode and a shaded position according to the first embodiment. The black matrix 76a simply needs to shade the sub-pixel Vpix to the position of a width 76h1a illustrated in FIG. 6, thereby hiding the contact 90H. An electric field applied to the endmost slit Sw between the comb tooth portion 131b closest to the edge of the aperture 76b and the contact 90H has different distribution from that of an electric field applied to the slit S between adjacent comb tooth portions 131a or between adjacent comb tooth portions 131b. If the black matrix 76a shades the sub-pixel Vpix to the position of a width 76h1b illustrated in FIG. 6 to hide the contact 90H and more than half of the endmost slit Sw, the rate of change in the transmittance of the endmost slit Sw can be made closer to that of the slit S. Alternatively, if the black matrix 76a shades the sub-pixel Vpix to the position of a width 76h1c illustrated in FIG. 6 to hide the contact 90H and the endmost slit Sw, it is not necessary to consider the difference in the rate of change in the transmittance between the endmost slit Sw and the slit S. This structure can make the luminance in the aperture 76b uniform.

Figure 7:
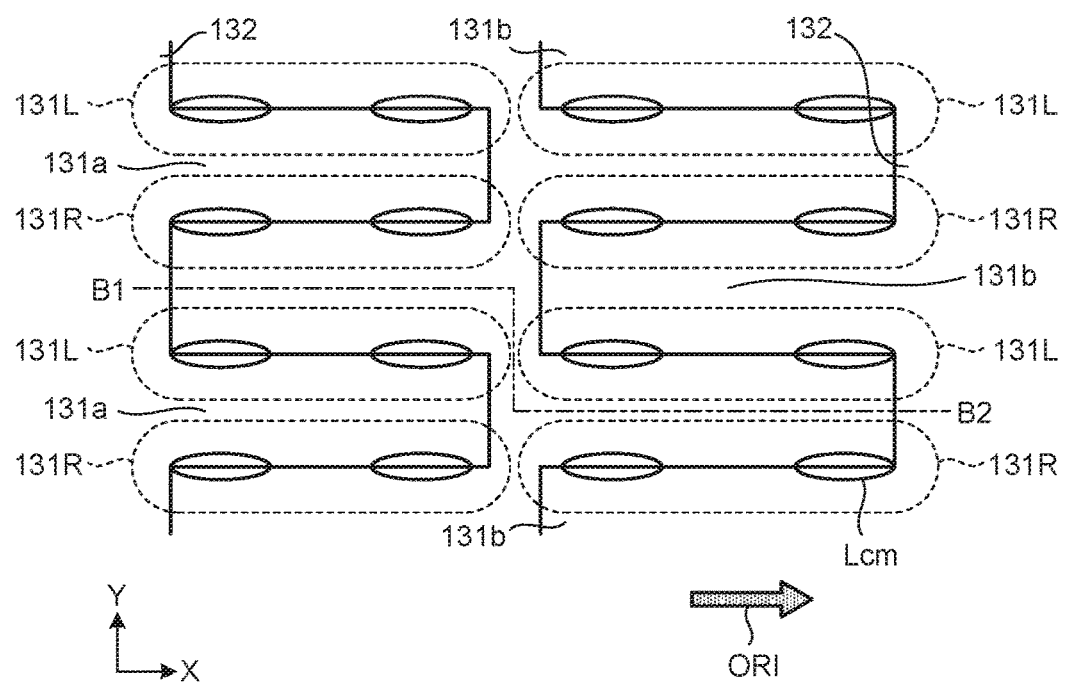
FIG. 7 is a schematic view for explaining orientation of
liquid crystals in a state where no voltage to generate an electric field between the first electrode and a second electrode is applied in the liquid crystal display device according to the first embodiment.
Figure 8:
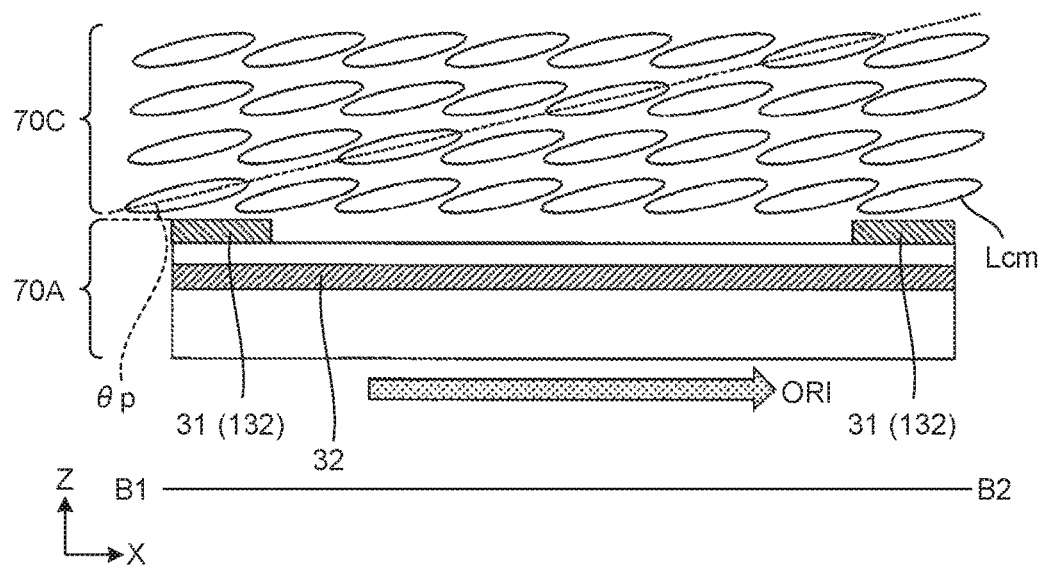
FIG. 8 is a schematic view of a section along line B1-B2 in FIG. 7.
Figure 9:
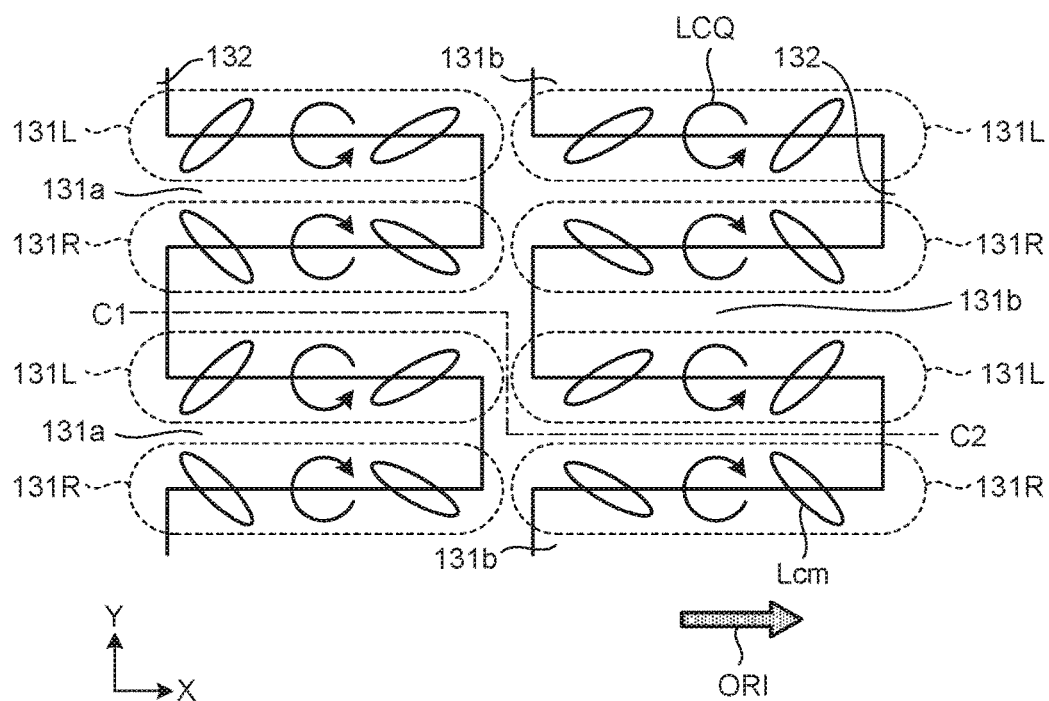
FIG. 9 is a schematic view for explaining orientation of the liquid crystals in a state where a voltage to generate an electric field between the first electrode and the second electrode is applied in the liquid crystal display device according to the first embodiment.
Figure 10:
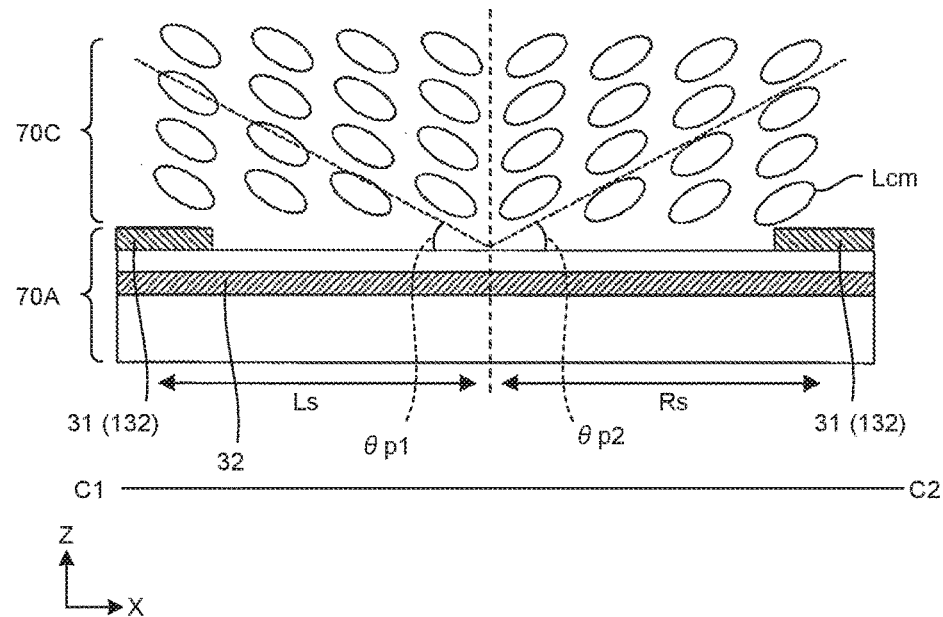
FIG. 10 is a schematic view of a section along line C1-C2 in FIG. 9.
Figure 11:
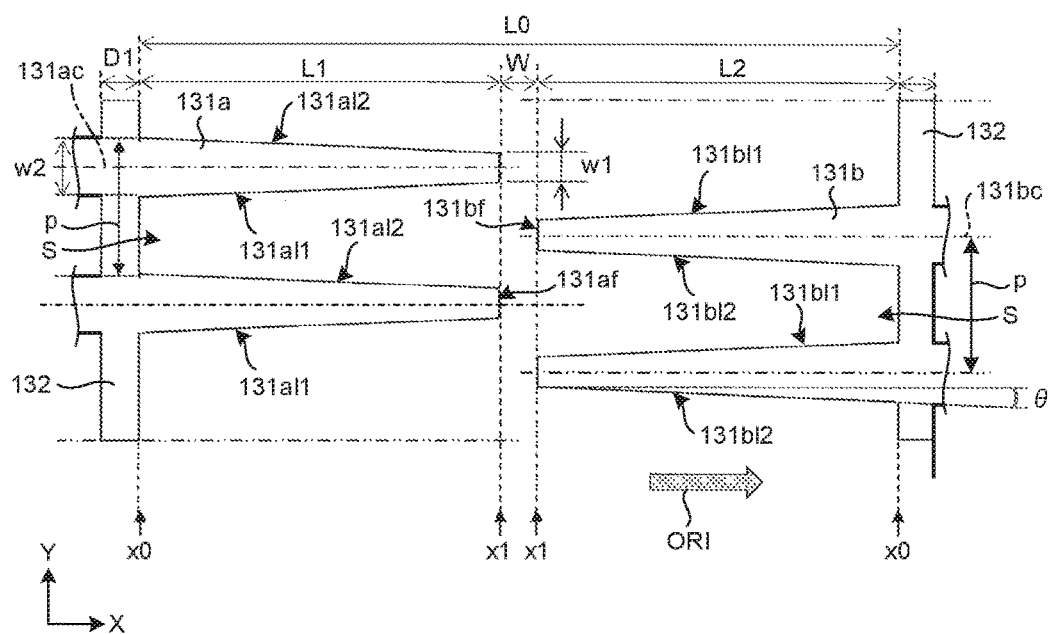
FIG. 11 is a schematic view for explaining in detail the shape of the first electrode in a pixel according to the first embodiment.

FIG. 7 is a schematic view for explaining orientation of the liquid crystals in a state where no voltage to generate an electric field between the first electrode and the second electrode is applied in the liquid crystal display device according to the first embodiment. FIG. 8 is a schematic view of a section along line B1-B2 in FIG. 7. FIG. 9 is a schematic view for explaining orientation of the liquid crystals in a state where a voltage to generate an electric field between the first electrode and the second electrode is applied in the liquid crystal display device according to the first embodiment. FIG. 10 is a schematic view of a section along line C1-C2 in FIG. 9. FIG. 11 is a schematic view for explaining in detail the shape of the first electrode in a pixel according to the first embodiment.

As described above, the first orientation film 73a is subjected to orientation processing in the orientation direction ORI illustrated in FIGS. 3 and 5 so as to have the predetermined initial orientation in the X-direction. In a case where no voltage to generate an electric field between the first electrode 31 and the second electrode 32 is applied, the long-axis direction of the liquid crystal molecules Lcm in the liquid crystal layer 70C tends to be aligned parallel to the direction in which the comb tooth portions 131a and the comb tooth portions 131b extend as illustrated in FIG. 7. As a result, the liquid crystal molecules Lcm are initially oriented parallel to the direction in which the comb tooth portions 131a and the comb tooth portions 131b extend at neighboring areas of a right long side 131R and a left long side 131L of the comb tooth portions 131a and the comb tooth portions 131b facing in the width direction of the slit S. The liquid crystal molecules Lcm illustrated in FIG. 8 are initially oriented along the orientation direction ORI and upward in the orientation direction ORI so as to have a pretilt angle θp with respect to the surface of the TFT substrate 71.

When a voltage to generate an electric field between the first electrode 31 and the second electrode 32 is applied, the liquid crystal molecules Lcm rotate in a liquid crystal rotation direction LCQ as illustrated in FIG. 9. In other words, the liquid crystal rotation direction LCQ is a direction of twist or rotation of the liquid crystals in the X-Y plane. The liquid crystal molecules Lcm positioned at the neighboring area of the right long side 131R and those at the neighboring area of the left long side 131L are affected by electric fields in opposite directions and thus tend to rotate in opposite directions.

As described above, when a voltage is applied to the first electrode 31 and the second electrode 32, the liquid crystal layer 70C of the liquid crystal display device 1 according to the first embodiment causes the liquid crystal molecules Lcm in the neighboring area of the right long side 131R and those in the neighboring area of the left long side 131L to rotate in opposite directions. The right long side 131R is one of the sides of adjacent comb tooth portions 131a (131b) facing in the width direction of the slit S, whereas the left long side 131L is the other of the sides. The liquid crystal molecules Lcm in the liquid crystal display device 1 according to the first embodiment respond to a change in the electric field between the first electrode 31 and the second electrode 32 at higher speed than in the FFS-mode liquid crystal display device described in JP-A-2008-52161. As a result, the liquid crystal display device 1 according to the first embodiment increases the response speed.

The response speed is a speed at which the transmittance of the liquid crystals is shifted between predetermined levels when a voltage is applied to the first electrode 31 and the second electrode 32. In other words, the response speed is specified by a time required to shift the transmittance from a state where no voltage is applied (e.g., transmittance=0) to a state where a voltage is applied (transmittance=1) or a time required to shift the transmittance from the state where a voltage is applied to the state where no voltage is applied.

When a voltage to generate an electric field between the first electrode 31 and the second electrode 32 is applied, the long-axis direction of the liquid crystal molecules Lcm rotates in a plane (X-Y plane) parallel to the surface of the pixel substrate 70A (TFT substrate 71) and changes also in the Z-direction as illustrated in FIG. 10. The first electrode 31 and the second electrode 32 are arranged facing each other in a direction perpendicular to the surface of the pixel substrate 70A (TFT substrate 71). Therefore, the electric field generated between the first electrode 31 and the second electrode 32 serves as a fringe electric field passing through the slits S. The fringe electric field causes the long axis of the liquid crystal molecules Lcm to rotate in the liquid crystal rotation directions LCQ (clockwise and counterclockwise) in the X-Y plane illustrated in FIG. 9 and to rise in the direction (Z-direction) perpendicular to the surface of the pixel substrate 70A (TFT substrate 71). The liquid crystal rotation directions LCQ may possibly be mixed at the center area of the slits S.

As illustrated in FIG. 10, the long-axis direction of the liquid crystal molecules Lcm has an angle θp2 larger than the pretilt angle θp in a slit area Rs between the comb tooth portions 131b. The long-axis direction of the liquid crystal molecules Lcm has an angle θp1 opposite to the pretilt angle θp in a slit area Ls between the comb tooth portions 131a. The long-axis direction of the liquid crystal molecules Lcm in the slit area Ls may possibly be less likely to rise and have lower responsiveness than the long-axis direction of the liquid crystal molecules Lcm in the slit area Rs does.

By specifying the shape of the first electrode 31 more finely as illustrated in FIG. 11, it is possible to increase the responsiveness of the liquid crystal display device 1 according to the first embodiment. As illustrated in FIG. 11, L0 represents a total slit length between the electrode base portions 132 in the X-direction, for example. L1 represents a comb tooth protrusion length of the comb tooth portions 131a in the X-direction. The comb tooth protrusion length L1 corresponds to the length from a position x1 of a tip 131af of the comb tooth portions 131a to a protrusion start position x0 in the electrode base portion 132. Similarly, L2 represents a comb tooth protrusion length of the comb tooth portions 131b in the X-direction. The comb tooth protrusion length L2 corresponds to the length from a position x1 of a tip 131bf of the comb tooth portions 131b to a protrusion start position x0 in the electrode base portion 132. w1 represents the width of the tip 131af of the comb tooth portions 131a and the tip 131bf of the comb tooth portions 131b in the Y-direction. The total slit length L0 is preferably set to 10 µm to 60 µm, for example. The total slit length L0 is more preferably set smaller than 40 µm, specifically to 20 µm, for example. In the liquid crystal display device 1 according to the first embodiment, a decrease in the total slit length L0 increases the orientation stability of the liquid crystals, whereas an increase in the total slit length L0 increases the luminance.

As described above, the long-axis direction of the liquid crystal molecules Lcm in the slit area Ls in FIG. 10 may possibly be less likely to rise and have lower responsiveness than the long-axis direction of the liquid crystal molecules Lcm in the slit area Rs does. To make the slit area Ls smaller than the slit area Rs, the comb tooth protrusion length L1 illustrated in FIG. 11 is made smaller than the comb tooth protrusion length L2 of the comb tooth portions 131b positioned on the downstream of the comb tooth portions 131a in the orientation direction ORI. Thus, the liquid crystal display device 1 according to the first embodiment can increase the response speed.

The width w1 of the tip 131af of the comb tooth portions 131a and the tip 131bf of the comb tooth portions 131b in the Y-direction is set to 2 µm to 5 µm, for example. Setting the width w1 smaller can increase the response speed.

A slit pitch (array pitch) p between adjacent comb tooth portions 131a is equal to an array pitch between adjacent comb tooth portions 131b. The tip 131af of the comb tooth portions 131a and the tip 131bf of the comb tooth portions 131b are arranged alternately in the Y-direction. With this structure, the right long side 131R of the comb tooth portions 131a and the right long side 131R of the comb tooth portions 131b are aligned in the X-direction as illustrated in FIG. 9. The left long side 131L of the comb tooth portions 131a and the left long side 131L of the comb tooth portions 131b are also aligned in the X-direction as illustrated in FIG. 9. As a result, the liquid crystal rotation directions LCQ in which the liquid crystal molecules Lcm rotate are the same direction viewed in the X-direction, thereby stabilizing the rotation behavior of the liquid crystal molecules Lcm. Because a decrease in the slit pitch p increases the response speed, the slit pitch p is preferably set smaller than 9 µm.

The gap between the tip 131af of the comb tooth portions 131a and the tip 131bf of the comb tooth portions 131b illustrated in FIG. 11 corresponds to a width W in the X-direction of a communicating aperture extending in the Y-direction. The width W is preferably set to a smaller value. The width W of the communicating aperture in the X-direction is set to 7 µm or smaller, for example, and more preferably to 4 µm or smaller. The width W of the communicating aperture in the X-direction may be set to 0 or smaller. In a case where W=0 is satisfied, for example, the tip 131af of the comb tooth portions 131a and the tip 131bf of the comb tooth portions 131b are aligned in the Y-direction. In this case, the tips are arranged with gaps interposed therebetween in the Y-direction, whereby a plurality of slits S communicate with one another. In a case where W<0 is satisfied, the tip 131af of the comb tooth portions 131a and the tip 131bf of the comb tooth portions 131b enter into the respective slits S adjacent thereto in the X-direction. In other words, the comb tooth portions 131a and the comb tooth portion 131b are alternately engaged.

w2 represents the width of the comb tooth portions 131a in the Y-direction at the protrusion start position x0 in the electrode base portion 132. The width w2 is larger than the width w1 of the tip 131af of the comb tooth portions 131a in the Y-direction. Thus, the comb tooth portions 131a have a trapezoidal shape. A long side 131a/1 and a long side 131a/2 of the comb tooth portions 131a are oblique to a reference direction of a virtual line 131ac passing through the center of the comb tooth portions 131a (X-direction in which the comb tooth portions 131a extend) by an angle θ. Setting the angle θ larger than 0.5 degree can facilitate alignment of the liquid crystal rotation directions LCQ in which the liquid crystal molecules Lcm rotate, thereby stabilizing the behavior of rotation of the liquid crystal molecules Lcm.

Similarly, w2 represents the width of the comb tooth portions 131b in the Y-direction at the protrusion start position x0 in the electrode base portion 132. The width w2 is larger than the width w1 of the tip 131bf of the comb tooth portions 131b in the Y-direction. Thus, the comb tooth portions 131b have a trapezoidal shape. A long side 131b/1 and a long side 131b/2 of the comb tooth portions 131b are oblique to a reference direction of a virtual line 131bc passing through the center of the comb tooth portions 131b (X-direction in which the comb tooth portions 131b extend) by an angle θ. Setting the angle θ larger than 0.5 degree can facilitate alignment of the liquid crystal rotation directions LCQ in which the liquid crystal molecules Lcm rotate, thereby stabilizing the behavior of rotation of the liquid crystal molecules Lcm. As described above, the liquid crystal display device 1 according to the first embodiment has the liquid crystal rotation directions aligning on lines adjacent to each other in the X-direction and on the X-direction line, thereby achieving high orientation stability.

To increase the comb tooth protrusion length L1 of the comb tooth portions 131a or the comb tooth protrusion length L2 of the comb tooth portions 131b, it is necessary to increase the angle θ. An increase in the angle increases the difference between the width w1 and the width w2, resulting in limitation on the slit pitch p. In a case where the angle θ is 0.5 degrees to 1.0 degree, for example, the comb tooth protrusion length L1 of the comb tooth portions 131a or the comb tooth protrusion length L2 of the comb tooth portions 131b is preferably set to 45 µm or smaller.

Because the electrode base portion 132 does not contribute to transmission of light, a width D1 of the electrode base portion 132 in the X-direction (direction orthogonal to the direction in which the electrode base portion 132 extends) is preferably set to a smaller value. The width D1 is preferably set larger than 0 µm and equal to or smaller than 4 µm. Setting the width D1 larger than 0 µm can increase the conductivity, and setting the width D1 equal to or smaller than 4 µm can suppress reduction in the transmittance. In a case where the width D1 is larger than 0 µm and equal to or smaller than 4 µm and where the comb tooth protrusion length L1 of the comb tooth portions 131a or the comb tooth protrusion length L2 of the comb tooth portions 131b is 45 µm or smaller, the display area 21 can serve as a high-definition screen of 160 pixels per inch (ppi) or higher. Assuming the width w1 is 0.5 µm, for example, the width w2 is preferably set to 1 µm or larger to ensure the quality throughout the comb tooth protrusion length L1 of the comb tooth portions 131a or the comb tooth protrusion length L2 of the comb tooth portions 131b.

As described above, setting the slit pitch p smaller can increase the response speed. A decrease in the slit pitch p, however, increases the width of the comb tooth portions 131a and the comb tooth portions 131b in the Y-direction, for example, resulting in an increase in the area that does not contribute to transmission of light. An effective way to increase the transmittance is to increase the comb tooth protrusion length L1 of the comb tooth portions 131a or the comb tooth protrusion length L2 of the comb tooth portions 131b. This structure, however, may possibly make the liquid crystal rotation directions LCQ in which the liquid crystal molecules Lcm rotate unlikely to align, resulting in unstable behavior of the liquid crystal molecules Lcm.

Figure 12:
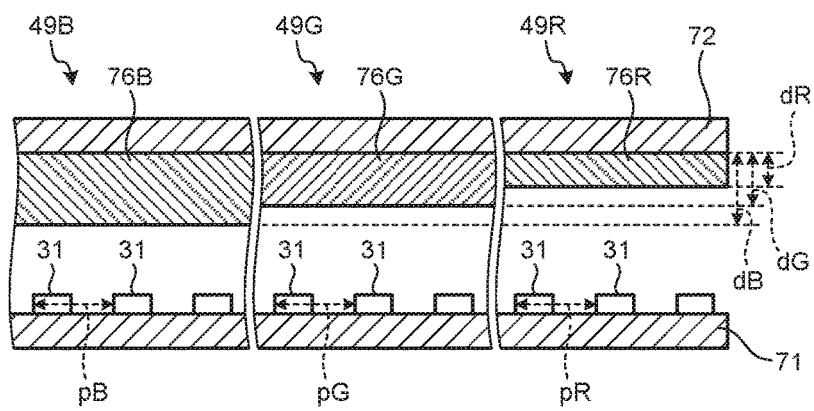
FIG. 12 is a sectional schematic view for explaining a slit pitch of each sub-pixel in one pixel according to the first embodiment.

FIG. 12 is a sectional schematic view for explaining the slit pitch of each sub-pixel in one pixel according to the first embodiment. As described above, the color filters 76R, 76G, and 76B color the light passing through the aperture 76b with the three colors of R, G, and B, respectively, for example. Thus, the sub-pixels Vpix of difference color areas in respective colors are formed, including a first sub-pixel 49R corresponding to a color area of R, a second sub-pixel 49G corresponding to a color area of G, and a third sub-pixel 49B corresponding to a color area of B. The color filters 76R, 76G, and 76B need to have predetermined thicknesses dR, dG, and dB, respectively, depending on the required hues. The response speed of the liquid crystals varies depending on the cell thickness corresponding to the thickness of the liquid crystal layer. The cell thickness corresponds to the distance between the TFT substrate 71 and each of the color filters 76R, 76G, and 76B. An increase in the thicknesses of the color filters dR, dG, and dB decreases the cell thickness, whereas a decrease in the thicknesses of the color filters dR, dG, and dB increases the cell thickness.

Typically, an increase in the cell thickness increases the response time of the liquid crystals, whereas a decrease in the cell thickness decreases the response time of the liquid crystals. In other words, a smaller cell thickness increases the response speed of the liquid crystals. Setting the slip pitch p smaller can increase the response speed in the liquid crystal display device 1 according to the first embodiment. Setting the slip pitch p smaller, however, may possibly make the behavior of the liquid crystal molecules Lcm unstable, thereby reducing the orientation stability of the liquid crystals.

In a case where the thickness dB of the color filter 76B is larger than the thickness dR of the color filter 76R, a slit pitch pB of the third sub-pixel 49B is set larger than a slit pitch pR of the first sub-pixel 49R in the liquid crystal display device 1 according to the first embodiment. In other words, the slit pitch pB of the third sub-pixel 49B is set larger than the slit pitch pR of the first sub-pixel 49R. With this structure, the response speed of the third sub-pixel 49B is made lower than that of the first sub-pixel 49R.

In a case where the thickness dB of the color filter 76B is larger than the thickness dR of the color filter 76R, the response time of the third sub-pixel 49B is smaller than that of the first sub-pixel 49R in accordance with the difference between the thickness dB and the thickness dR. In other words, the response speed of the third sub-pixel 49B is higher than that of the first sub-pixel 49R.

Specifically, an increase in the film thickness dB of the color filter 76B in the third sub-pixel 49B decreases the cell thickness. A decrease in the cell thickness decreases the response time and increases the response speed. Furthermore, an increase in the slit pitch pB in the third sub-pixel 49B increases the response time and decreases the response speed.

By contrast, a decrease in the film thickness dR of the color filter 76R in the first sub-pixel 49R increases the cell thickness. An increase in the cell thickness increases the response time and decreases the response speed. Furthermore, a decrease in the slit pitch pR in the first sub-pixel 49R decreases the response time and increases the response speed.

The response speed of the first sub-pixel 49R is preferably set substantially equal to that of the third sub-pixel 49B in a single pixel Pix. To achieve this, the slit pitch pB of the third sub-pixel 49B is set larger than the slit pitch pR of the first sub-pixel 49R in the liquid crystal display device 1 according to the first embodiment. This structure stabilizes the rotation of the liquid crystal molecules Lcm in the third sub-pixel 49B.

G has the highest human visibility of the three colors of R, G, and B. The second sub-pixel 49G is less affected by the area that does not contribute to transmission of light than the first sub-pixel 49R and the third sub-pixel 49B are. Therefore, a slit pitch pG of the second sub-pixel 49G can be set smaller than the slit pitch pB of the third sub-pixel 49B in the liquid crystal display device 1 according to the first embodiment. This structure can reduce an influence of unstable behavior of the liquid crystal molecules Lcm, thereby stabilizing the display quality. The slit pitch pG of the second sub-pixel 49G can be set equal to or smaller than the slit pitch pR of the first sub-pixel 49R in the liquid crystal display device 1 according to the first embodiment. Alternatively, the slit pitch pG of the second sub-pixel 49G can be set smaller than the slit pitch pR of the first sub-pixel 49R in the liquid crystal display device 1 according to the first embodiment.

As described above, the slit pitch pB of the third sub-pixel 49B and the slit pitch pR of the first sub-pixel 49R, which are at least two color areas out of the different color areas of R, G, and B, are different in size in the liquid crystal display device 1 according to the first embodiment. In a case where the cell thickness of the third-sub pixel 49B provided with the color filter 76B is smaller than that of the first-sub pixel 49R provided with the color filter 76R, the slit pitch pB of the third sub-pixel 49B is set larger than the slit pitch pR of the first sub-pixel 49R. This structure increases the orientation stability of the liquid crystals in the third sub-pixel 49B. As a result, the liquid crystal display device 1 according to the first embodiment achieves a higher response speed of the entire pixel Pix and higher orientation stability in the third sub-pixel 49B, thereby improving the display quality in a display surface.

In a case where a value obtained by multiplying the cell thickness of the third sub-pixel 49B by the slit pitch pB is substantially equal to a value obtained by multiplying the cell thickness of the first sub-pixel 49R by the slit pitch pR, the response speed of the liquid crystals of the third sub-pixel 49B is substantially equal to that of the first sub-pixel 49R. Thus, the liquid crystal display device 1 according to the first embodiment further improves the display quality in a display surface. Being substantially equal indicates that the ratio of the value obtained by multiplying the cell thickness of the third sub-pixel 49B by the slit pitch pB to the value obtained by multiplying the cell thickness of the first sub-pixel 49R by the slit pitch pR falls within a range of 0.8 to 1.2.

The slit pitch pB of the third sub-pixel 49B and the slit pitch pG of the second sub-pixel 49G, which are at least two color areas out of the different color areas of R, G, and B, are different in size in the liquid crystal display device 1 according to the first embodiment. This structure can increase the orientation stability of the liquid crystals in the first sub-pixel 49R and the third sub-pixel 49B within a range where no influence is exerted on the second sub-pixel 49G. As a result, the liquid crystal display device 1 according to the first embodiment achieves a higher response speed of the entire pixel Pix and higher orientation stability in the first sub-pixel 49R and the third sub-pixel 49B, thereby improving the display quality in a display surface.

As described above, the slit pitch pG of the second sub-pixel 49G in the color area having the highest human visibility is set smaller than the slit pitch pB and the slit pitch pR. With this structure, the liquid crystal display device 1 according to the first embodiment achieves a higher response speed of the entire pixel Pix and higher orientation stability in the first sub-pixel 49R and the third sub-pixel 49B, thereby further improving the display quality in a display surface.

Manufacturing Method

The method for manufacturing the liquid crystal display device 1 according to the first embodiment includes the following process, for example. A manufacturing apparatus performs a first substrate preparation process to prepare a glass substrate, which is a translucent substrate, as the TFT substrate 71 of the pixel substrate (first substrate) 70A.

Subsequently, the manufacturing apparatus forms the scanning line $24_m$ and the gate electrode 93 on the TFT substrate 71. The manufacturing apparatus then forms the insulation film 741 between the scanning line $24_m$ and the gate electrode 93, and the semiconductor layer 92 to be formed, on the TFT substrate 71. The manufacturing apparatus then forms the layer of the source electrode 91, the drain electrode 90, and the semiconductor layer 92, for example. The manufacturing apparatus then forms the insulation film 742 between the semiconductor layer 92 and the signal line $25_n$ to be formed. The manufacturing apparatus then forms the signal line $25_n$ and couples the signal line $25_n$ to the source electrode 91. The manufacturing apparatus then forms the insulation film 743 between the signal line $25_n$ and the second electrode 32 to be formed.

Subsequently, the manufacturing apparatus forms a film of the second electrode 32 serving as the pixel electrode by sputtering or etching, for example. The manufacturing apparatus then couples the drain electrode 90 to the second electrode 32 via the conductive contact 90H. The thickness of the second electrode 32 is 10 nm to 100 nm, for example. The manufacturing apparatus then forms the insulation film 744 on the second electrode 32 by plasma-enhanced chemical vapor deposition (CVD), for example.

Subsequently, the manufacturing apparatus forms a film of the first electrode 31 by sputtering or etching, for example. The thickness of the first electrode 31 is 10 nm to 100 nm, for example. The first electrode 31 is formed into a comb teeth shape with the slits S. The manufacturing apparatus then forms the first orientation film 73a by performing processing in the orientation direction ORI on a polymeric material such as a polyimide on the first electrode 31. Thus, the manufacturing apparatus performs the manufacturing process of the first substrate.

The manufacturing apparatus performs a second substrate preparation process to prepare a glass substrate, which is a translucent substrate, as the glass substrate 72 of the counter substrate (second substrate) 70B.

The manufacturing apparatus forms the layer of the color filters 76R, 76G, and 76B and the black matrix 76a on the glass substrate 72 and then forms an overcoat layer and the like on the layer. The manufacturing apparatus then forms the second orientation film 73b by performing processing antiparallel (in an opposite direction) to the orientation direction ORI on a polymeric material such as a polyimide on the overcoat layer. Thus, the manufacturing apparatus performs the manufacturing process of the second substrate.

The manufacturing apparatus causes the pixel substrate 70A and the counter substrate 70B to face each other. The manufacturing apparatus injects liquid crystals between the substrates and seals the liquid crystal section with the frame edge, thereby forming the liquid crystal layer 70C. The back surface of the pixel substrate 70A is provided with a polarizing plate and the back light 6, whereas the front surface thereof is provided with a polarizing plate and the like. The driver IC3 is coupled to an electrode terminal on the frame edge. Thus, the liquid crystal display device 1 is manufactured.

While the first embodiment uses a-Si as the semiconductor layer 92 included in the TFT element Tr, it is not limited thereto. The embodiment may use polycrystalline silicon (poly-Si) as the semiconductor layer 92. The embodiment may use another semiconductor material (e.g., germanium (Ge)) instead of silicon or a material obtained by adding another material to silicon (e.g., silicon germanium (SiGe)). The embodiment may use an oxide semiconductor material as the semiconductor layer 92. Examples of the oxide semiconductor material include, but are not limited to, an oxide semiconductor material including indium (In), etc.

In the first embodiment, the TFT element Tr is a bottom gate TFT in which the gate electrode 93 is provided below the semiconductor layer 92. The first embodiment may use a top gate TFT in which the gate electrode 93 is provided above the semiconductor layer 92 if possible. In a case where a top gate TFT is used as the TFT element Tr, the manufacturing apparatus manufactures: the semiconductor layer 92, the scanning line $24_m$ and the gate electrode 93, and the signal line $25_n$ in this order; or the semiconductor layer 92, the signal line $25_n$, and the scanning line $24_m$ and the gate electrode 93 in this order, instead of the manufacturing process described above.

First Modification of the First Embodiment

Figure 13:
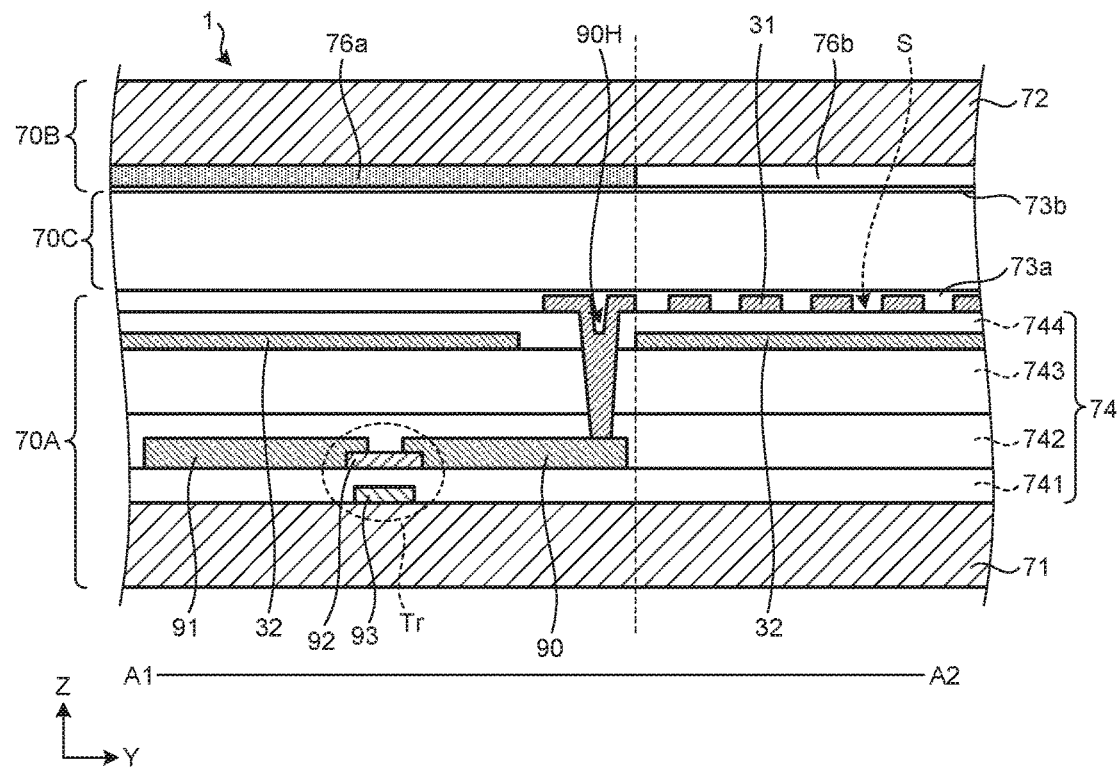
FIG. 13 is a schematic view of a modification of the section along line A1-A2 in FIG. 3 in the liquid crystal display device according to a first modification of the first embodiment.

The liquid crystal display device 1 according to a first modification of the first embodiment will be described. FIG. 13 is a schematic view of a modification of the section along line A1-A2 in FIG. 3 in the liquid crystal display device according to the first modification of the first embodiment. Components identical to those described in the first embodiment are denoted by like reference numerals, and overlapping explanation thereof will be omitted.

The liquid crystal display device 1 according to the first modification of the first embodiment generates, in a direction parallel to the TFT substrate 71, an electric field (lateral electric field) between the first electrode 31 and the second electrode 32 laminated in a direction (Z-direction) perpendicular to the surface of the TFT substrate 71 of the pixel substrate 70A. As a result, liquid crystal molecules in the liquid crystal layer 70C rotate in a plane parallel to the substrate surface. The liquid crystal display device 1 uses a change in the light transmittance corresponding to the rotation of the liquid crystal molecules, thereby performing display. The second electrode 32 illustrated in FIG. 13 corresponds to the common electrode COM, whereas the first electrode 31 corresponds to the pixel electrode, for example. The first electrode 31 is coupled to the drain electrode 90 via the conductive contact 90H, for example. The first electrode 31 is sectioned by each area of the sub-pixel Vpix and has an independent pattern electrically insulated from the first electrode 31 in an area of the sub-pixel Vpix adjacent thereto. The liquid crystal display device 1 according to the first modification of the first embodiment provides the same advantages as those of the first embodiment.

Second Modification of the First Embodiment

Figure 14:
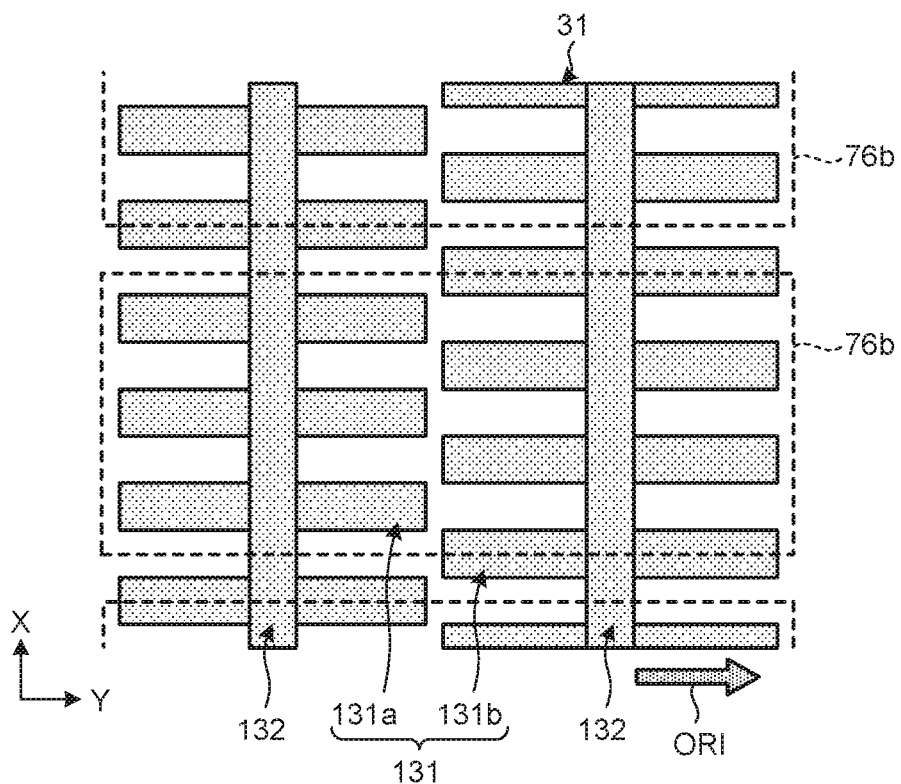
FIG. 14 is a schematic view for explaining a modification of the relation between the shape of the first electrode and the aperture in the liquid crystal display device according to a second modification of the first embodiment.

The liquid crystal display device 1 according to a second modification of the first embodiment will be described. FIG. 14 is a schematic view for explaining a modification of the relation between the shape of the first electrode and the aperture in the liquid crystal display device according to the second modification of the first embodiment. Components identical to those described in the first embodiment are denoted by like reference numerals, and overlapping explanation thereof will be omitted.

The first electrode 31 includes the comb tooth portions 131 protruding from the electrode base portion 132 extending in the X-direction. The comb tooth portions 131 include the comb tooth portions 131a and the comb tooth portions 131b extending in opposite directions from the electrode base portion 132. Adjacent comb tooth portions 131a protrude from the electrode base portion 132 with a certain distance interposed therebetween. Similarly, adjacent comb tooth portions 131b protrude from the electrode base portion 132 with a certain distance interposed therebetween. From a single electrode base portion 132, the comb tooth portions 131a extend in the Y-direction, and the comb tooth portions 131b extend in a direction opposite to the extending direction of the comb tooth portions 131a in the Y-direction.

The first orientation film 73a is subjected to orientation processing in the orientation direction ORI illustrated in FIG. 14 so as to have predetermined initial orientation in the Y-direction. The second orientation film 73b is subjected to orientation processing antiparallel to the orientation direction ORI of the first orientation film 73a. The orientation directions of the first orientation film 73a and the second orientation film 73b are antiparallel to each other. The liquid crystal display device 1 according to the second modification of the first embodiment provides the same advantages as those of the first embodiment.

Third Modification of the First Embodiment

Figure 15:
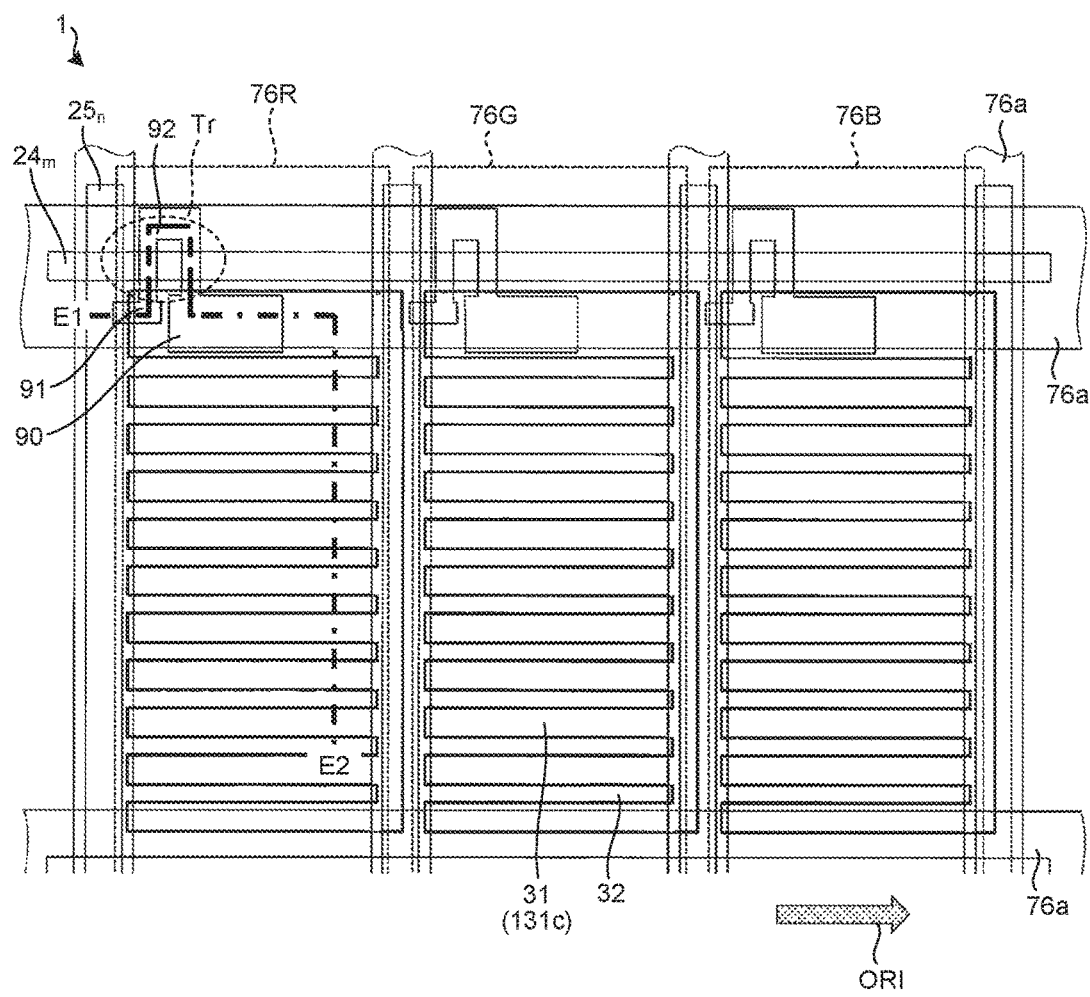
FIG. 15 is a plan view for explaining a pixel in the liquid crystal display device according to a third modification of the first embodiment.
Figure 16:
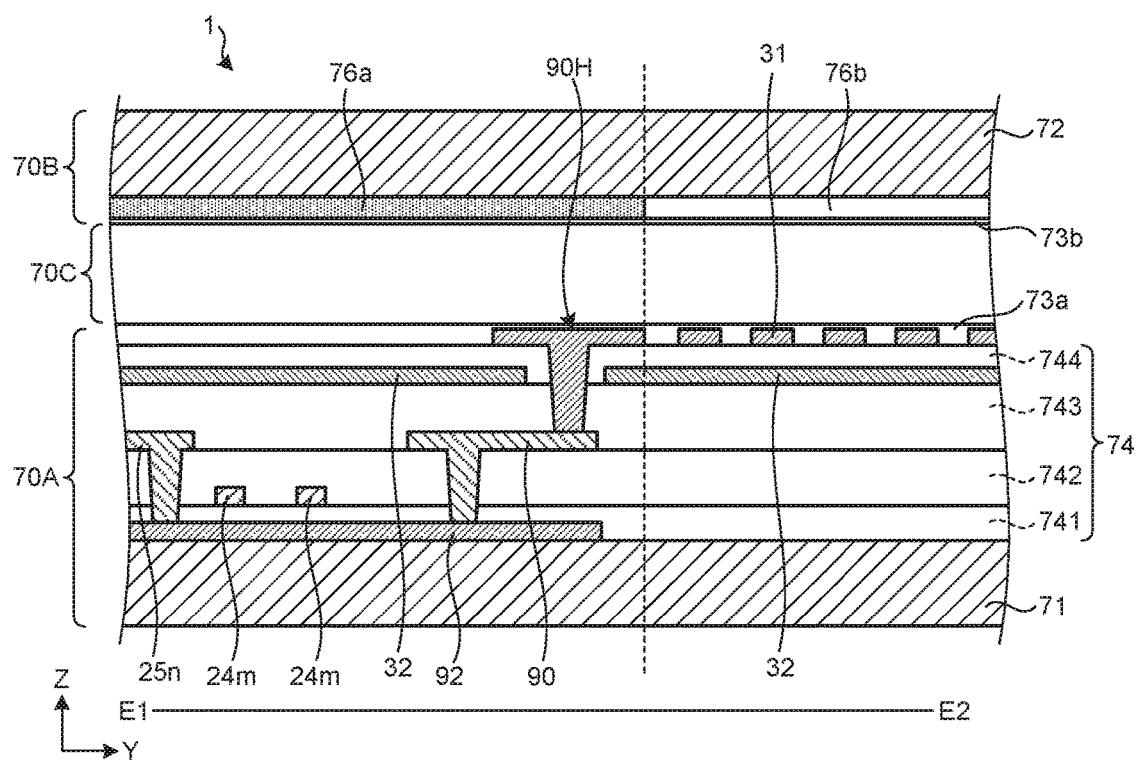
FIG. 16 is a schematic view of a section along line E1-E2 in FIG. 15.

The liquid crystal display device 1 according to a third modification of the first embodiment will be described. FIG. 15 is a plan view for explaining a pixel in the liquid crystal display device according to the third modification of the first embodiment. FIG. 16 is a schematic view of a section along line E1-E2 in FIG. 15. Components identical to those described in the first embodiment are denoted by like reference numerals, and overlapping explanation thereof will be omitted.

As illustrated in FIG. 15, the semiconductor layer 92 is made of poly-Si constituting the TFT element Tr. The semiconductor layer 92 is a double-gate transistor having a channel in two areas.

As illustrated in FIGS. 15 and 16, the liquid crystal display device 1 according to the third modification of the first embodiment generates, in a direction parallel to the TFT substrate 71, an electric field (lateral electric field) between the first electrode 31 and the second electrode 32 laminated in a direction (Z-direction) perpendicular to the surface of the TFT substrate 71 of the pixel substrate 70A. As a result, liquid crystal molecules in the liquid crystal layer 70C rotate in a plane parallel to the substrate surface. The liquid crystal display device 1 uses a change in the light transmittance corresponding to the rotation of the liquid crystal molecules, thereby performing display. The second electrode 32 illustrated in FIG. 16 corresponds to the common electrode COM, whereas the first electrode 31 corresponds to the pixel electrode, for example. The first electrode 31 is coupled to the conductive drain electrode 90, for example. The first electrode 31 is sectioned by each area of the sub-pixel Vpix and has an independent pattern electrically insulated from the first electrode 31 in an area of the sub-pixel Vpix adjacent thereto.

The first orientation film 73a is subjected to orientation processing in the orientation direction ORI illustrated in FIG. 15 so as to have predetermined initial orientation in the X-direction. The second orientation film 73b is subjected to orientation processing antiparallel to the orientation direction ORI of the first orientation film 73a. The orientation directions of the first orientation film 73a and the second orientation film 73b are antiparallel to each other.

Similarly to the liquid crystal display device 1 according to the first embodiment, when a voltage is applied to the first electrode 31 and the second electrode 32, the liquid crystal layer 70C of the liquid crystal display device 1 according to the third modification of the first embodiment rotates the liquid crystal molecules in the neighboring area of the right long side 131R and those in the neighboring area of the left long side 131L in opposite directions. The right long side 131R is one of the sides of adjacent comb tooth portions 131c facing in the width direction of the slit S, whereas the left long side 131L is the other of the sides. Thus, the liquid crystal molecules in the liquid crystal display device 1 according to the third modification of the first embodiment respond to a change in the electric field between the first electrode 31 and the second electrode 32 at higher speed than in the FFS-mode liquid crystal display device described in JP-A-2008-52161. As a result, the liquid crystal display device 1 according to the third modification of the first embodiment increases the response speed.

Similarly to the comb tooth protrusion length L2 of the comb tooth portions 131b, the angle θ needs to be increased to increase a comb tooth protrusion length L3 of the comb tooth portions 131c. An increase in the angle increases the difference between the width w1 and the width w2, resulting in limitation on the slit pitch p. In a case where the angle θ is 0.5 degrees to 1.0 degree, for example, the comb tooth protrusion length L3 of the comb tooth portions 131c is preferably set to 45 μm or smaller.

Because the electrode base portion 132 does not contribute to transmission of light, the width D1 of the electrode base portion 132 in the X-direction (direction orthogonal to the extending direction of the electrode base portion 132) is preferably set to a smaller value. The width D1 is preferably set larger than 0 μm and equal to or smaller than 4 μm. Setting the width D1 larger than 0 μm can increase the conductivity, whereas setting the width D1 equal to or smaller than 4 μm can suppress reduction in the transmittance. In a case where the width D1 is larger than 0 μm and equal to or smaller than 4 μm and where the comb tooth protrusion length of the comb tooth portions 131c is 45 μm or smaller, the display area 21 can serve as a high-definition screen of 160 ppi or higher. Assuming the width w1 is 0.5 μm, for example, the width w2 is preferably set to 1 μm or larger to ensure the quality throughout the comb tooth protrusion length of the comb tooth portions 131c.

As described above, setting the slit pitch p smaller can increase the response speed. A decrease in the slit pitch p, however, increases the width of the comb tooth portions 131c in the Y-direction, for example, resulting in an increase in the area that does not contribute to transmission of light. The liquid crystal display device 1 according to the third modification of the first embodiment provides the same advantages as those of the first embodiment.

Second Embodiment

Figure 17:
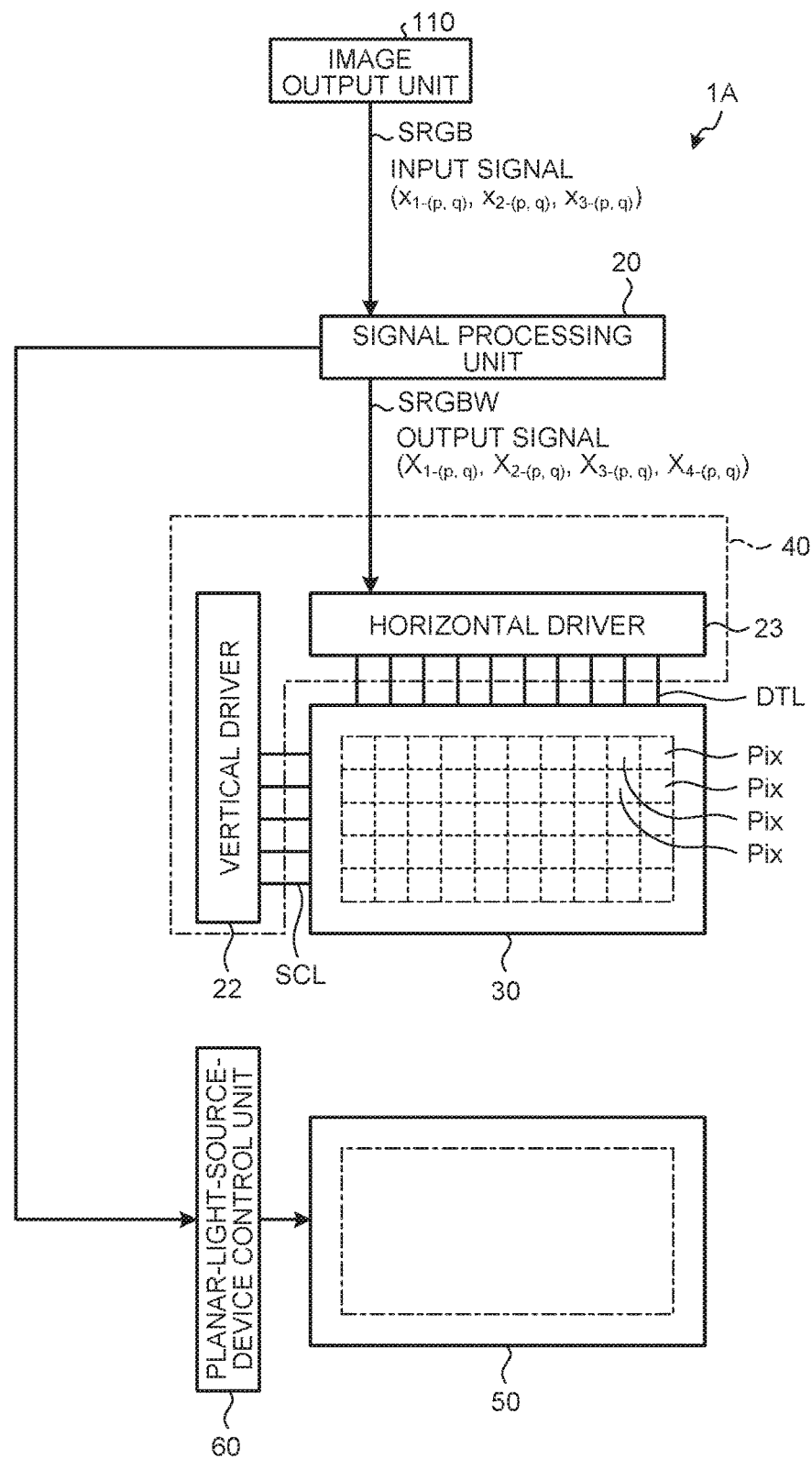
FIG. 17 is a block diagram of an exemplary system configuration of a liquid crystal display device according to a second embodiment of the present disclosure.
Figure 18:
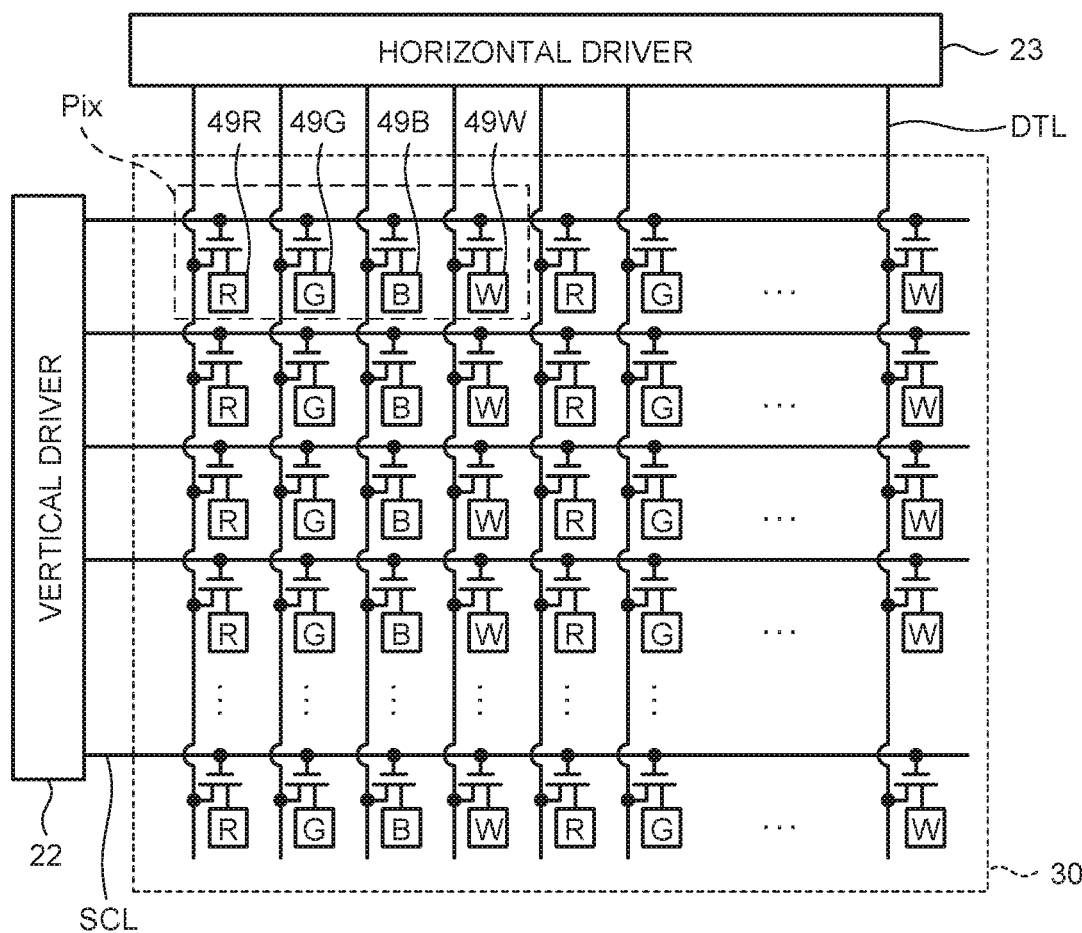
FIG. 18 is a schematic view for explaining a pixel array of the liquid crystal display device according to the second embodiment.
Figure 19:
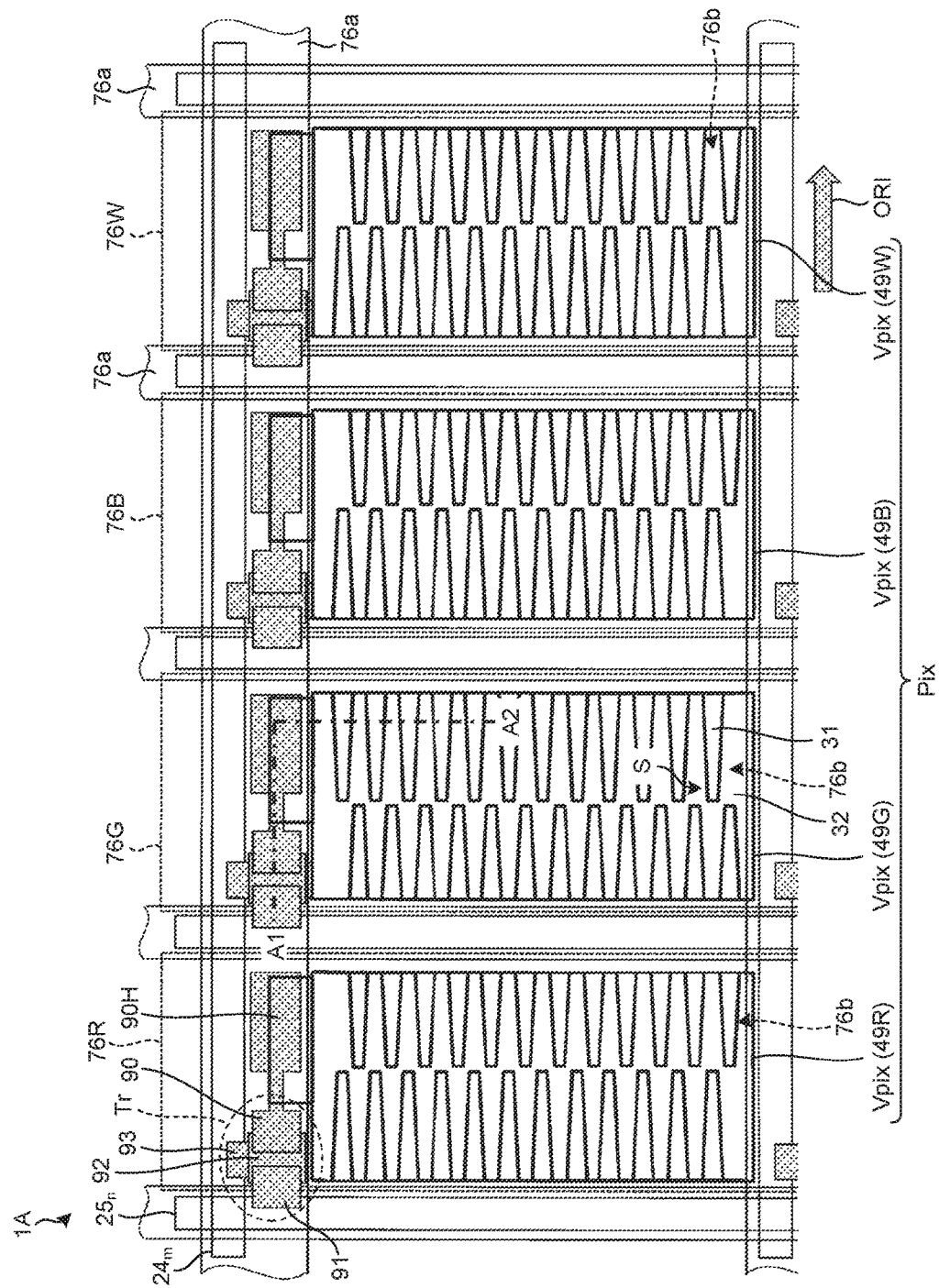
FIG. 19 is a plan view for explaining a pixel of the liquid crystal display device according to the second embodiment.
Figure 20:
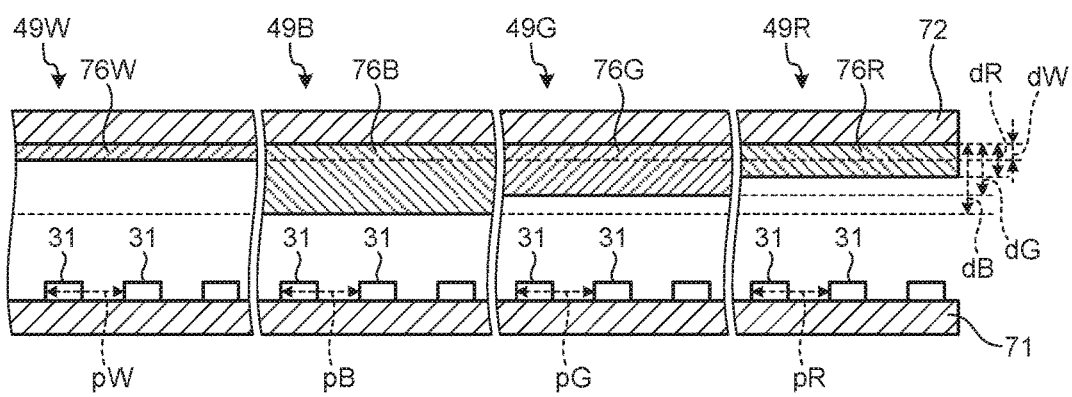
FIG. 20 is a sectional schematic view for explaining the slit pitch of each sub-pixel in one pixel according to the second embodiment.
Figure 21:
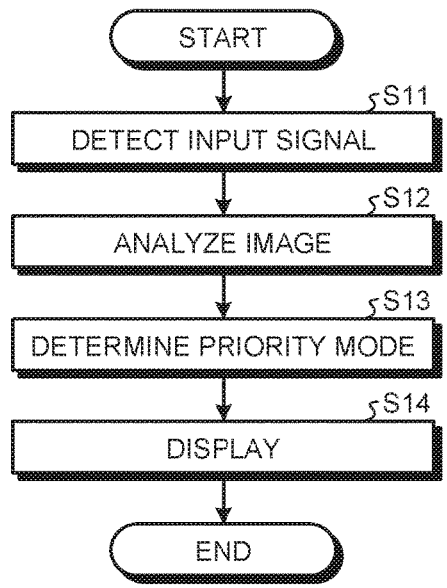
FIG. 21 is a flowchart of a method for driving the liquid crystal display device according to the second embodiment.

The liquid crystal display device 1A according to a second embodiment of the present disclosure will be described. FIG. 17 is a block diagram of an exemplary system configuration of the liquid crystal display device according to the second embodiment. FIG. 18 is a schematic view for explaining a pixel array of the liquid crystal display device according to the second embodiment. FIG. 19 is a plan view for explaining a pixel of the liquid crystal display device according to the second embodiment. FIG. 20 is a sectional schematic view for explaining the slit pitch of each sub-pixel in one pixel according to the second embodiment. FIG. 21 is a flowchart of a method for driving the liquid crystal display device according to the second embodiment. Components identical to those described in the first embodiment and the first to the third modifications are denoted by like reference numerals, and overlapping explanation thereof will be omitted.

FIG. 17 is a block diagram of an exemplary configuration of the liquid crystal display device according to the present embodiment. FIG. 18 is a schematic view of a pixel array in an image display panel according to the present embodiment.

As illustrated in FIG. 17, a liquid crystal display device 1A includes a signal processing unit 20, an image display panel (display unit) 30, an image-display-panel drive circuit 40, a planar light source device 50, and a planar-light-source-device control unit 60. The signal processing unit 20 receives an input signal SRGB of an image from an image output unit 110 and transmits an output signal SRGBW to each unit of the liquid crystal display device 1A to control an operation of each unit. The image display panel 30 displays an image based on the output signal SRGBW output from the signal processing unit 20. The image-display-panel drive circuit 40 controls drive of the image display panel 30. The planar light source device 50 irradiates the back surface of the image display panel 30 with light. The planar-light-source-device control unit 60 controls drive of the planar light source device 50. The liquid crystal display device 1A has the same configuration as that of the image display device assembly described in Japanese Patent Application Laid-open Publication No. 2011-154323 (JP-A-2011-154323). Various modifications described in JP-A-2011-154323 are applicable to the liquid crystal display device 1A.

The signal processing unit 20 is an arithmetic processing unit that controls an operation of the image display panel 30 and the planar light source device 50. The signal processing unit 20 is coupled to the image-display-panel drive circuit 40 that drives the image display panel 30 and to the planar-light-source-device control unit 60 that drives the planar light source device 50. The signal processing unit 20 processes an input signal received from the outside, thereby generating an output signal and a planar-light-source-device control signal. Specifically, the signal processing unit 20 converts an input value (input signal) in an input HSV (Hue-Saturation-Value, Value is also called Brightness) color space of the input signal into an extended value in an extended HSV color space extended by a first color, a second color, a third color, and a fourth color, thereby generating an output signal. The signal processing unit 20 then outputs the generated output signal to the image display panel 30. The signal processing unit 20 outputs the generated output signal to the image-display-panel drive circuit 40 and the generated planar-light-source-device control signal to the planar-light-source-device control unit 60.

As illustrated in FIG. 17, the image display panel 30 has $P_0 \times Q_0$ pixels Pix ($P_0$ in the row direction and $Q_0$ in the column direction) arranged in a two-dimensional matrix (rows and columns). FIG. 17 illustrates an example where a plurality of pixels Pix are arranged in a matrix in the XY two-dimensional coordinate system. In this example, the row direction corresponds to the X-direction, and the column direction corresponds to the Y-direction.

The pixel Pix includes the first sub-pixel 49R, the second sub-pixel 49G, the third sub-pixel 49B, and a fourth sub-pixel 49W as a plurality of different color areas. The first sub-pixel 49R displays a first primary color (e.g., red). The second sub-pixel 49G displays a second primary color (e.g., green). The third sub-pixel 49B displays a third primary color (e.g., blue). The fourth sub-pixel 49W displays a fourth primary color (e.g., white). Thus, the pixels Pix arranged in rows and columns on the image display panel 30 each include the first sub-pixel 49R that displays the first color, the second sub-pixel 49G that displays the second color, the third sub-pixel 49B that displays the third color, and the fourth sub-pixel 49W that displays the fourth color. The first, the second, the third, and the fourth colors are not limited to the first, the second, and the third primary colors and white, respectively, and may be different colors, such as complementary colors. The fourth sub-pixel 49W that displays the fourth color is preferably brighter than the first sub-pixel 49R that displays the first color, the second sub-pixel 49G that displays the second color, and the third sub-pixel 49B that displays the third color when being irradiated with the same amount of light of the light source. In the following description, the first sub-pixel 49R, the second sub-pixel 49G, the third sub-pixel 49B, and the fourth sub-pixel 49W are referred to as a sub-pixel 49 if they need not be distinguished.

More specifically, the liquid crystal display device 1A is a transmissive color liquid crystal display device. As illustrated in FIG. 19, the image display panel 30 is a color liquid crystal display panel. The first color filter 76R that causes the first primary color to pass therethrough is arranged between the first sub-pixel 49R and an image observer. The second color filter 76G that causes the second primary color to pass therethrough is arranged between the second sub-pixel 49G and the image observer. The third color filter 76B that causes the third primary color to pass therethrough is arranged between the third sub-pixel 49B and the image observer. The image display panel 30 may have no color filter between the fourth sub-pixel 49W and the image observer. The sub-pixel provided with no color filter displays white. The fourth sub-pixel 49W may be provided with a color filter 76W made of a transparent resin layer instead of a color filter. Arrangement of the color filter 76W made of a transparent resin layer in the image display panel 30 can suppress the occurrence of a large gap above the fourth sub-pixel 49W, otherwise a large gap occurs because no color filter is arranged for the fourth sub-pixel 49W. The color filters 76R, 76G, 76B, and 76W need to have predetermined thicknesses dR, dG, dB, and dW, respectively, depending on the required hues.

The added color may be a color other than white, such as yellowish white, bluish white, and reddish white, or may be yellow. In a case where yellow is used as the added color, the color filter simply needs to be colored with yellow.

The image-display-panel drive circuit 40 illustrated in FIGS. 17 and 18 is included in a control unit according to the present embodiment and includes the horizontal driver 23 and the vertical driver 22. The horizontal driver 23 in the image-display-panel drive circuit 40 holds video signals and sequentially outputs them to the image display panel 30. The horizontal driver 23 is electrically coupled to the image display panel 30 with signal lines DTL. The vertical driver 22 in the image-display-panel drive circuit 40 selects a sub-pixel in the image display panel 30. The vertical driver 22 controls turning on and off of a switching element (e.g., a TFT) that controls an operation (light transmittance) of the sub-pixel. The vertical driver 22 is electrically coupled to the image display panel 30 with scanning lines SCL.

The planar light source device 50 is arranged on the back surface of the image display panel 30. The planar light source device 50 irradiates the image display panel 30 with light, thereby illuminating the image display panel 30. The planar-light-source-device control unit 60 controls the amount of light and the like output from the planar light source device 50. The back light 6 according to the first embodiment corresponds to the planar light source device 50 and the planar-light-source-device control unit 60.

As illustrated in FIG. 17, the signal processing unit 20 receives an input signal SRGB, which is information on an image to be displayed, from the external image output unit 110. The input signal SRGB contains information on an image (color) to be displayed at a position of each pixel as an input signal. Specifically, the signal processing unit 20 receives a signal for the (p,q)-th pixel Pix ($1 \leq p \leq P_0$, $1 \leq q \leq Q_0$) in the image display panel 30 having $P_0 \times Q_0$ pixels Pix arranged in a matrix. The signal contains an input signal for the first sub-pixel 49R having a signal value of $x_{1-(p,q)}$, an input signal for the second sub-pixel 49G having a signal value of $x_{2-(p,q)}$, and an input signal for the third sub-pixel 49B having a signal value of $x_{3-(p,q)}$ (refer to FIG. 17).

The signal processing unit 20 illustrated in FIG. 17 processes the input signal, thereby generating an output signal for the first sub-pixel (a signal value of $X_{1-(p,q)}$ to determine a display gradation of the first sub-pixel 49R, an output signal for the second sub-pixel (a signal value of $X_{2-(p,q)}$) to determine a display gradation of the second sub-pixel 49G, an output signal for the third sub-pixel (a signal value of $X_{3-(p,q)}$) to determine a display gradation of the third sub-pixel 49B, and an output signal for the fourth sub-pixel (a signal value of $X_{4-(p,q)}$) to determine a display gradation of the fourth sub-pixel 49W. The signal processing unit 20 then outputs the output signals to the image-display-panel drive circuit 40.

The liquid crystal display device 1A includes the fourth sub-pixel 49W that displays the fourth color (white) in a pixel Pix. Thus, the liquid crystal display device 1A can broaden the dynamic range of brightness in the HSV color space (extended HSV color space).

The signal processing unit 20 stores therein the maximum value Vmax(S) of the brightness obtained using the saturation S as variables in the HSV color space extended by adding the fourth color (white). In other words, the signal processing unit 20 stores therein the maximum value Vmax(S) of the brightness for each of coordinates (coordinate values) of the saturation and the hue in a three-dimensional HSV color space. The input signal contains the input signals for the first sub-pixel 49R, the second sub-pixel 49G, and the third sub-pixel 49B. Therefore, the HSV color space of the input signal has a cylindrical shape, that is, the same shape as that of a cylindrical part of the extended HSV color space.

The signal processing unit 20 calculates the output signal for the first sub-pixel 49R (a signal value of $X_{1-(p,q)}$) based on at least the input signal for the first sub-pixel 49R (a signal value of $x_{1-(p,q)}$) and an expansion coefficient α and outputs the output signal to the first sub-pixel 49R. The signal processing unit 20 calculates the output signal for the second sub-pixel 49G (a signal value of $X_{2-(p,q)}$) based on at least the input signal for the second sub-pixel 49G (a signal value of $x_{2-(p,q)}$) and the expansion coefficient α and outputs the output signal to the second sub-pixel 49G. The signal processing unit 20 calculates the output signal for the third sub-pixel 49B (a signal value of $X_{3-(p,q)}$) based on at least the input signal for the third sub-pixel 49B (a signal value of $x_{3-(p,q)}$) and the expansion coefficient α and outputs the output signal to the third sub-pixel 49B. The signal processing unit 20 calculates the output signal for the fourth sub-pixel 49W (a signal value of $X_{4-(p,q)}$) based on the input signal for the first sub-pixel 49R (a signal value of $x_{1-(p,q)}$), the input signal for the second sub-pixel 49G (a signal value of $x_{2-(p,q)}$), and the input signal for the third sub-pixel 49B (a signal value of $x_{3-(p,q)}$) and outputs the output signal to the fourth sub-pixel 49W.

Specifically, the signal processing unit 20 calculates the output signal for the first sub-pixel 49R based on the expansion coefficient α of the first sub-pixel 49R and the output signal for the fourth sub-pixel 49W. The signal processing unit 20 calculates the output signal for the second sub-pixel 49G based on the expansion coefficient α of the second sub-pixel 49G and the output signal for the fourth sub-pixel 49W. The signal processing unit 20 calculates the output signal for the third sub-pixel 49B based on the expansion coefficient α of the third sub-pixel 49B and the output signal for the fourth sub-pixel 49W.

In the (p,q)-th pixel (or a set of the first sub-pixel 49R, the second sub-pixel 49G, and the third sub-pixel 49B), assuming χ is a constant depending on the liquid crystal display device, the signal processing unit 20 derives a signal value of $X_{1-(p,q)}$ serving as the output signal for the first sub-pixel 49R by calculating Equation (1), a signal value of $X_{2-(p,q)}$ serving as the output signal for the second sub-pixel 49G by calculating Equation (2), and a signal value of $X_{3-(p,q)}$ serving as the output signal for the third sub-pixel 49B by calculating Equation (3):

$$X_{1-(p,q)} = \alpha \cdot x_{1-(p,q)} - \chi \cdot X_{4-(p,q)} \tag{1}$$

$$X_{2-(p,q)} = \alpha \cdot x_{2-(p,q)} - \chi \cdot X_{4-(p,q)} \tag{2}$$

$$X_{3-(p,q)} = \alpha \cdot x_{3-(p,q)} - \chi \cdot X_{4-(p,q)} \tag{3}$$

The signal processing unit 20 calculates the maximum value Vmax(S) of the brightness using the saturation S as variables in the HSV color space extended by adding the fourth color. Based on the input signal values of the sub-pixels 49 in the pixels Pix, the signal processing unit 20 calculates the saturation S and a brightness V(S) of the pixels Pix.

The saturation S is expressed by: S=(Max−Min)/Max, whereas the brightness V(S) is expressed by: V(S)=Max. The saturation S has a value of 0 to 1, whereas the brightness V(S) has a value of 0 to ($2^n-1$). n denotes the bit number of the display gradation. Max denotes the maximum value of the input signal values for the first sub-pixel 49R, the second sub-pixel 49G, and the third sub-pixel 49B in the pixel Pix. Min denotes the minimum value of the input signal values for the first sub-pixel 49R, the second sub-pixel 49G, and the third sub-pixel 49B in the pixel Pix. A hue H is expressed by 0 degrees to 360 degrees. The hue H has colors of red, yellow, green, cyan, blue, magenta, and red from 0 degrees to 360 degrees.

In the present embodiment, a signal value of $X_{4-(p,q)}$ can be derived as the product of Min(and the expansion coefficient α. Specifically, a signal value of $X_{4-(p,q)}$ can be derived using Equation (4). While the product of $Min_{(p,q)}$ and the expansion coefficient α is divided by χ, which will be described later, in Equation (4), it is not limited thereto. The expansion coefficient α is determined for each image display frame.

$$X_{4-(p,q)} = Min_{(p,q)} \cdot \alpha / \chi \tag{4}$$

Typically, in the (p,q)-th pixel, saturation $S_{(p,q)}$ in the cylindrical HSV color space is derived using Equation (5), and brightness $V(S)_{(p,q)}$ is derived using Equation (6) based on the input signal for the first sub-pixel 49R (a signal value of $x_{1-(p,q)}$), the input signal for the second sub-pixel 49G (a signal value of $x_{2-(p,q)}$), and the input signal for the third sub-pixel 49B (a signal value of $x_{3-(p,q)}$):

$$S_{(p,q)} = (Max_{(p,q)} - Min_{(p,q)})/Max_{(p,q)} \tag{5}$$

$$V(S)_{(p,q)} = Max_{(p,q)} \tag{6}$$

$Max_{(p,q)}$ denotes the maximum value of the input signal values of the three sub-pixels 49 of ($x_{1-(p,q)}$, $x_{2-(p,q)}$, $x_{3-(p,q)}$). $Min_{(p,q)}$ denotes the minimum value of the input signal values of the three sub-pixels 49 of ($x_{1-(p,q)}$, $x_{2-(p,q)}$, $x_{3-(p,q)}$). In the present embodiment, n=8 is satisfied. In other words, the bit number of the display gradation is set to 8 bits (the value of the display gradation has 256 levels of 0 to 255).

The fourth sub-pixel 49W that displays white is provided with no color filter. $BN_{1-3}$ denotes the luminance of an aggregate of the first sub-pixel 49R, the second sub-pixel 49G, and the third sub-pixel 49B included in a pixel Pix or a group of pixels Pix when the first-sub pixel 49R receives a signal having a value corresponding to the maximum signal value of the output signal for the first sub-pixel, the second-sub pixel 49G receives a signal having a value corresponding to the maximum signal value of the output signal for the second sub-pixel, and the third-sub pixel 49B receives a signal having a value corresponding to the maximum signal value of the output signal for the third sub-pixel. $BN_4$ denotes the luminance of the fourth sub-pixel 49W included in the pixel Pix or the group of pixels Pix when the fourth-sub pixel 49W receives a signal having a value corresponding to the maximum signal value of the output signal for the fourth sub-pixel 49W. In other words, $BN_{1-3}$ denotes the maximum luminance of white displayed by the aggregate of the first sub-pixel 49R, the second sub-pixel 49G, and the third sub-pixel 49B. Assuming $\chi$ is a constant depending on the liquid crystal display device, the constant $\chi$ is expressed by: $\chi = BN_4/BN_{1-3}$.

Specifically, the luminance $BN_4$ in a case where the fourth sub-pixel 49W receives an input signal having a display gradation value of 255 is 1.5 times the luminance $BN_{1-3}$ of white in a case where the aggregate of the first sub-pixel 49R, the second sub-pixel 49G, and the third sub-pixel 49B receives an input signal having the following display gradation values: a signal value $x_{1-(p,q)}$ of 255; a signal value $X_{2-(p,q)}$ of 255; and a signal value $x_{3-(p,q)}$ of 255, for example. In other words, $\chi=1.5$ is satisfied in the present embodiment.

Assuming $X_{4-(p,q)}$ is expressed by Equation (4), Vmax(S) is expressed by Equation (7) and Equation (8):

$$V\max(S)=(\chi+1)\cdot(2^n-1) \text{ (where } S \leq S_0 \text{ is satisfied)} \quad (7)$$

$$V\max(S)=(2^n-1)\cdot(1/S) \text{ (where } S_0 < S \leq 1 \text{ is satisfied)} \quad (8),$$

where $S_0=1/(\chi+1)$

The signal processing unit 20 stores therein the maximum value Vmax(S) of the brightness obtained using the saturation S as variables in the HSV color space extended by adding the fourth color as a kind of look-up table, for example. Alternatively, the signal processing unit 20 calculates the maximum value Vmax(S) of the brightness using the saturation S as variables in the extended HSV color space each time.

The following describes a method for calculating the signal values $X_{1-(p,q)}$, $X_{2-(p,q)}$, $X_{3-(p,q)}$, and $X_{4-(p,q)}$ of the output signals for the (p,q)-th pixel Pix (extension processing). The processing is performed in such a manner as to maintain the ratio of the luminance of the first primary color displayed by (the first sub-pixel 49R and the fourth sub-pixel 49W), the luminance of the second primary color displayed by (the second sub-pixel 49G and the fourth sub-pixel 49W), and the luminance of the third primary color displayed by (the third sub-pixel 49B and the fourth sub-pixel 49W). The processing is performed in such a manner as to maintain (keep) the tone and the gradation-luminance characteristics (gamma ($\gamma$) characteristics). In a case where all the input signal values are 0 or small values in a pixel Pix or a group of pixels Pix, the expansion coefficient $\alpha$ is calculated without including the pixel Pix or the group of pixels Pix.

First Process

The signal processing unit 20 calculates the saturation S and the brightness V(S) in a plurality of pixels Pix based on input signal values for sub-pixels 49 in the pixels Pix. Specifically, the signal processing unit 20 calculates $S_{(p,q)}$ and $V(S)_{(p,q)}$ using Equation (7) and Equation (8) based on the signal value $x_{1-(p,q)}$ of the input signal for the first sub-pixel 49R in the (p,q)-th pixel Pix, the signal value $x_{2-(p,q)}$ of the input signal for the second sub-pixel 49G in the (p,q)-th pixel Pix, and the signal value $x_{3-(p,q)}$ of the input signal for the third sub-pixel 49B in the (p,q)-th pixel Pix. The signal processing unit 20 performs the processing on all the pixels Pix.

Second Process

Subsequently, the signal processing unit 20 calculates an expansion coefficient $\alpha(S)$ based on Vmax(S)/V(S) calculated in the pixels Pix.

$$\alpha(S)=V\max(S)/V(S) \quad (9)$$

Third Process

Subsequently, the signal processing unit 20 calculates the signal value $X_{4-(p,q)}$ for the (p,q)-th pixel Pix based on at least the signal values $x_{1-(p,q)}$, $x_{2-(p,q)}$, and $x_{3-(p,q)}$ of the input signals. The signal processing unit 20 according to the present embodiment determines the signal value $X_{4-(p,q)}$ based on $Min_{(p,q)}$, the expansion coefficient $\alpha$, and the constant $\chi$. More specifically, the signal processing unit 20 calculates the signal value $X_{4-(p,q)}$ using Equation (4). The signal processing unit 20 calculates the signal value $X_{4-(p,q)}$ for all the $P_0 \times Q_0$ pixels Pix.

Fourth Process

Subsequently, the signal processing unit 20 calculates the signal value $X_{1-(p,q)}$ for the (p,q)-th pixel Pix based on the signal value $x_{1-(p,q)}$, the expansion coefficient $\alpha$, and the signal value $X_{4-(p,q)}$. The signal processing unit 20 calculates the signal value $X_{2-(p,q)}$ for the (p,q)-th pixel Pix based on the signal value $x_{2-(p,q)}$, the expansion coefficient $\alpha$, and the signal value $X_{4-(p,q)}$. The signal processing unit 20 calculates the signal value $X_{3-(p,q)}$ for the (p,q)-th pixel Pix based on the signal value $x_{3-(p,q)}$, the expansion coefficient $\alpha$, and the signal value $X_{4-(p,q)}$. Specifically, the signal processing unit 20 calculates the signal values $X_{1-(p,q)}$, $X_{2-(p,q)}$, and $X_{3-(p,q)}$ for the (p,q)-th pixel Pix using Equations (1) to (3).

As indicated by Equation (4), the signal processing unit 20 extends $Min_{(p,q)}$ by $\alpha$. Expansion of $Min_{(p,q)}$ by $\alpha$ increases the luminance not only of the white display sub-pixel (the fourth sub-pixel 49W) but also of the red display sub-pixel (the first sub-pixel 49R), the green display sub-pixel (the second sub-pixel 49G), and the blue display sub-pixel (the third sub-pixel 49B) as indicated by the above Equation. The increase in the luminance can prevent dullness of the colors. Specifically, when the value of $Min_{(p,q)}$ is expanded by the expansion coefficient $\alpha$, the luminance of the entire image is increased $\alpha$ times compared with a case where $Min_{(p,q)}$ is not expanded. This configuration can display an image, such as a still image, with high luminance and thus is preferably used.

The luminance generated by the output signals $X_{1-(p,q)}$, $X_{2-(p,q)}$, $X_{3-(p,q)}$, and $X_{4-(p,q)}$ for the (p,q)-th pixel Pix is extended $\alpha$ times the luminance generated by the input signals $x_{1-(p,q)}$, $x_{2-(p,q)}$, and $x_{3-(p,q)}$. To provide the same luminance of an image as the luminance of an image the signal values of which are not extended, the liquid crystal display device 1A simply needs to reduce the luminance of the planar light source device 50 based on the expansion coefficient α. Specifically, the liquid crystal display device 1A simply needs to reduce the luminance of the planar light source device 50 1/α times.

As illustrated in FIG. 20, W has the highest human visibility of the four colors of R, G, B, and W. The fourth sub-pixel 49W is less affected by the area that does not contribute to transmission of light than the first sub-pixel 49R, the second sub-pixel 49G, and the third sub-pixel 49B are. Therefore, a slit pitch pW of the fourth sub-pixel 49W can be set smaller than the slit pitches pR, pG, and pB of the other sub-pixels in the liquid crystal display device 1A according to the second embodiment. This structure can reduce an influence of unstable behavior of the liquid crystal molecules Lcm, thereby stabilizing the display quality.

The liquid crystal display device 1A according to the second embodiment displays video not only in a four-pixel mode for replacing a white component in a color represented by the three colors of R, G, and B with the fourth sub-pixel 49W and displaying the video with the first sub-pixel 49R, the second sub-pixel 49G, the third sub-pixel 49B, and the fourth sub-pixel 49W. The liquid crystal display device 1A according to the second embodiment can display video also in a three-pixel mode for driving the first sub-pixel 49R, the second sub-pixel 49G, and the third sub-pixel 49B to display the video with the three colors of R, G, and B.

As described above, setting the slit pitch p smaller can increase the response speed. The liquid crystal display device 1A according to the second embodiment can represent colors of the same video by selecting the three-pixel mode or the four-pixel mode. In a case where the slit pitch pW of the fourth sub-pixel 49W is set smaller than the slit pitches pR, pG, and pB of the other sub-pixels, for example, the response speed of the liquid crystals in the fourth sub-pixel 49W is higher than that of the liquid crystals in the three sub-pixels of the first sub-pixel 49R, the second sub-pixel 49G, and the third sub-pixel 49B. The liquid crystal display device 1A according to the second embodiment can switch between the three-pixel mode and the four-pixel mode depending on a received image as described below.

As illustrated in FIG. 21, the signal processing unit 20 of the liquid crystal display device 1A according to the second embodiment detects an input signal (Step S11).

Subsequently, the liquid crystal display device 1A analyzes an image and generates input values (input signals) in the input HSV color space of the input signals and extended values (output signals) in the extended HSV color space extended by the first, the second, the third, and the fourth colors (Step S12).

Subsequently, the liquid crystal display device 1A performs operation for comparing the input values in the input HSV color space with the extended values in the extended HSV color space extended by the first, the second, the third, and the fourth colors. If the response speed required for the input values in the input HSV color space is higher than that for the extended values in the extended HSV color space, the liquid crystal display device 1A determines the three-pixel mode to be a priority mode. If the response speed required for the extended values in the extended HSV color space is higher than that for the input values in the input HSV color space, the liquid crystal display device 1A determines the four-pixel mode to be the priority mode (Step S13).

Subsequently, the liquid crystal display device 1A generates output signals based on the priority mode determined at Step S13 and outputs them to the image display panel 30 (Step S14). Thus, the liquid crystal display device 1A according to the second embodiment can select the three-pixel mode or the four-pixel mode depending on the response speed required for the received image to display the image. As a result, the liquid crystal display device 1A can further improve the display quality.

An electronic apparatus includes the liquid crystal display device 1A according to the second embodiment and the image output unit 110 serving as a control device that supplies input signals to the liquid crystal display device 1A. As described above, the electronic apparatus can switch between the three-pixel mode for performing display with the first sub-pixel 49R, the second sub-pixel 49G, and the third sub-pixel 49B, and the four-pixel mode for performing display with the first sub-pixel 49R, the second sub-pixel 49G, the third sub-pixel 49B, and the fourth sub-pixel 49W depending on the response speed required for the input signals. As a result, the electronic apparatus can display video having higher display quality on the liquid crystal display device 1A.

Modification of the Second Embodiment

As illustrated in FIG. 20, the color filters 76R, 76G, 76B, and 76W make the light passing through the aperture 76b into the four colors of R, G, B, and W, respectively, for example. The color filters 76R, 76G, 76B, and 76W need to have predetermined thicknesses dR, dG, dB, and dW, respectively, depending on the required hues. The response speed of the liquid crystals varies depending on the cell thickness corresponding to the thickness of the liquid crystal layer. The cell thickness corresponds to the distance between the TFT substrate 71 and each of the color filters 76R, 76G, 76B, and 76W. An increase in the thicknesses of the color filters dR, dG, dB, and dW decreases the cell thickness, whereas a decrease in the thicknesses of the color filters dR, dG, dB, and dW increases the cell thickness.

Similarly to the first embodiment, in a case where the cell thickness of the fourth sub-pixel 49W provided with the color filter 76W, out of two color filters of the color filter 76W and the color filter 76R, is smaller than that of the first sub-pixel 49R provided with the color filter 76R, the slit pitch pW of the fourth sub-pixel 49W may be set larger than the slit pitch pR of the first sub-pixel 49R.

In a case where the cell thickness of the third sub-pixel 49B provided with the color filter 76B, out of two color filters of the color filter 76B and the color filter 76R, is smaller than that of the first sub-pixel 49R provided with the color filter 76R, the slit pitch pB of the third sub-pixel 49B may be set larger than the slit pitch pR of the first sub-pixel 49R.

In the liquid crystal display device 1A according to the second embodiment, the slit pitch pW of the fourth sub-pixel 49W is set smaller than the slit pitches pR, pG, and pB of the other sub-pixels. Alternatively, the slit pitches pR, pG, and pB of the first sub-pixel 49R, the second sub-pixel 49G, and the third sub-pixel 49B, respectively, may be set smaller than the slit pitch pW of the fourth sub-pixel 49W.

In the liquid crystal display device 1A according to the second embodiment, the slit pitch pW of the fourth sub-pixel 49W in the color area having the highest human visibility may be set smaller than the slit pitches pG, pB, and pR. This structure can increase the response speed only in the fourth sub-pixel 49W having the highest visibility. The liquid crystal display device 1A may increase the response speed only in the fourth sub-pixel 49W and determine the four-pixel mode to be the priority mode. Thus, the liquid crystal display device 1A according to the second embodiment achieves a higher response speed of the entire pixel Pix and higher orientation stability in the first sub-pixel 49R and the third sub-pixel 49B, thereby further improving the display quality in a display surface.

In this case, if the response speed required for the input values in the input HSV color space is higher than that for the extended values in the extended HSV color space at Step S13, the liquid crystal display device 1A determines the four-pixel mode to be the priority mode. If the response speed required for the extended values in the extended HSV color space is higher than that for the input values in the input HSV color space, the liquid crystal display device 1A determines the three-pixel mode to be the priority mode.

Evaluation Examples

The following describes evaluation results of a first evaluation example, a second evaluation example, and a third evaluation example. These evaluation examples are not intended to limit the present invention.

Figure 22:
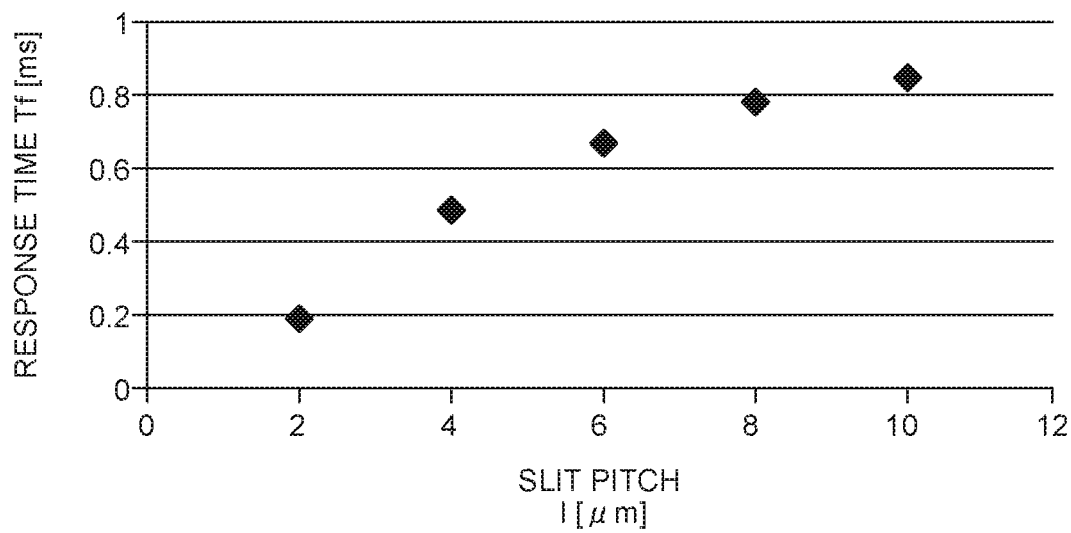
FIG. 22 is a diagram for explaining the relation between the response speed of the liquid crystals and the slit pitch.

FIG. 22 is a diagram for explaining the relation between the response speed of the liquid crystals and the slit pitch. The liquid crystal display device used in the first evaluation example is the liquid crystal display device according to the first embodiment and has a cell thickness d of 3 μm. In the first evaluation example, assuming a reference response time is 1, a relative value of a response time when a voltage is off with respect to the reference response time was simulated for each slit pitch 1 as a turn-off time Tf. The turn-off time Tf was simulated in cases where the slit pitch 1 was 2 μm, 4 μm, 8 μm, and 10 μm. FIG. 22 illustrates the simulation result. As illustrated in FIG. 22, in a case where the slit pitch 1 is equal to or smaller than 10 μm, the liquid crystal display device 1 has a shorter response time when a voltage is off. As a result, the liquid crystal display device 1 can increase the response speed of the liquid crystals.

Figure 23:
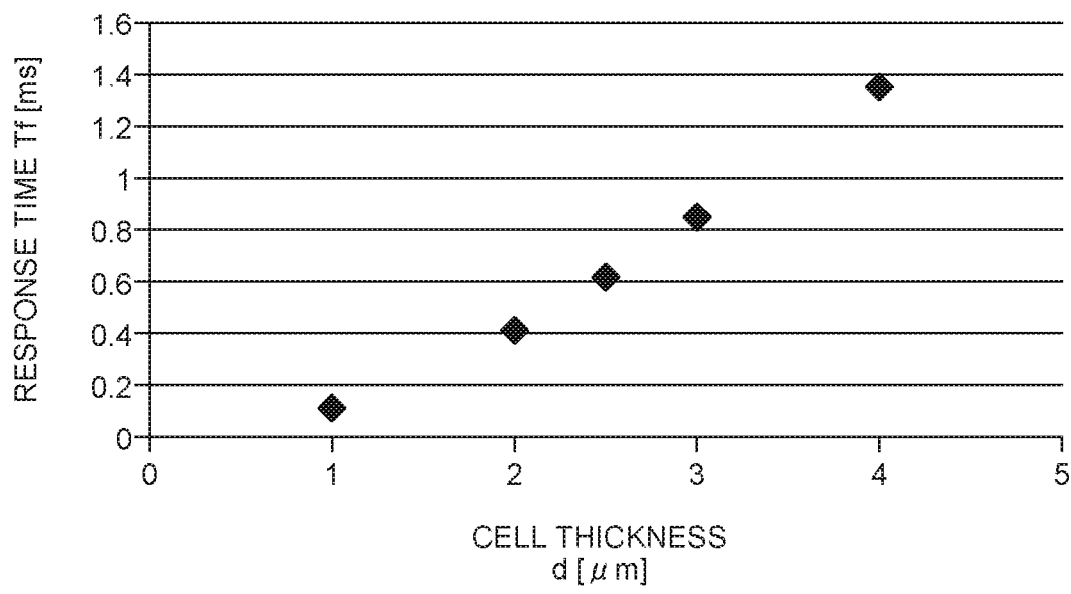
FIG. 23 is a diagram for explaining the relation between the response speed of the liquid crystals and the cell thickness.

FIG. 23 is a diagram for explaining the relation between the response speed of the liquid crystals and the cell thickness. The liquid crystal display device used in the second evaluation example is the liquid crystal display device according to the first embodiment and has a slit pitch 1 of 5 μm. In the second evaluation example, the relative value was simulated in cases where the cell thickness d was 1 μm, 2 μm, 3 μm, and 4 μm. FIG. 23 illustrates the simulation result. As illustrated in FIG. 23, a decrease in the cell thickness d decreases the response time. Thus, the liquid crystal display device 1 can reduce the response time when a voltage is off. As a result, the liquid crystal display device 1 can increase the response speed of the liquid crystals.

As illustrated in FIGS. 22 and 23, by causing the sub-pixels corresponding to the respective different color areas to have substantially the same value using the product of the cell thickness d and the slit pitch 1 as a reference, the response speeds of the liquid crystals in the respective sub-pixels are made uniform.

Figure 24:
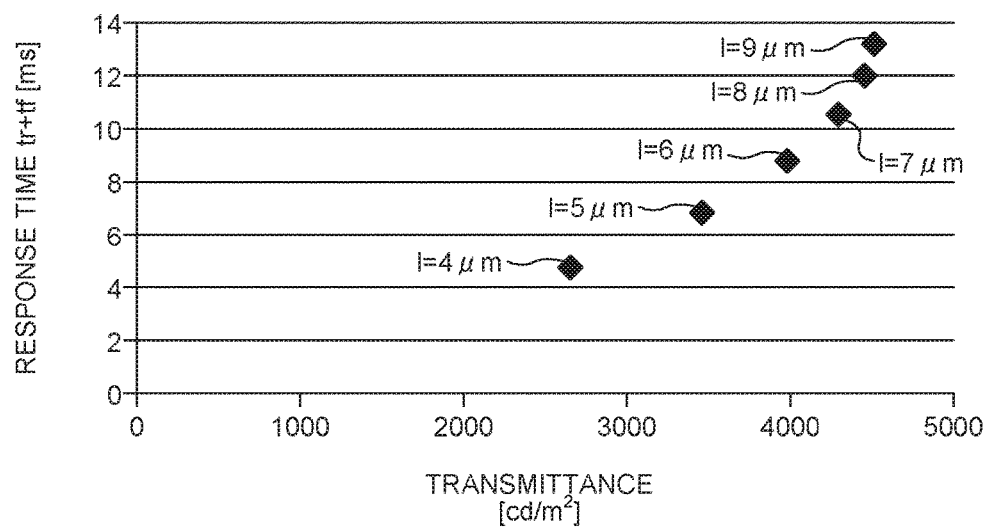
FIG. 24 is a diagram for explaining the relation between the slit pitch, the response time of the liquid crystals, and the transmittance.

FIG. 24 is a diagram for explaining the relation between the transmittance and the response time of the liquid crystals. The liquid crystal display device used in the third evaluation example is the liquid crystal display device according to the first embodiment and has a cell thickness d of 2.9 μm. In the third evaluation example, assuming a reference response time is 1, a relative value of a response time when a voltage is on with respect to the reference response time was simulated for each slit pitch 1 as a turn-on time Tr. Similarly to the first evaluation example, the turn-off time Tf was simulated for each slit pitch 1 in the third evaluation example. The response time in the third evaluation example is the sum of the turn-on time (rising time) Tr and the turn-off time (falling time) Tf. The response time was simulated in cases where the slit pitch 1 was 4 μm, 5 μm, 6 μm, 7 μm, 8 μm, and 9 μm. FIG. 24 illustrate the relation between the transmittance and the response time in each slit pitch 1 as the evaluation results of the third evaluation example. In the third evaluation example and FIG. 24, the transmittance is the maximum transmittance.

As illustrated in FIG. 24, an increase in the slit pitch increases the response time. In other words, an increase in the slit pitch decreases the response speed. By contrast, an increase in the slit pitch increases the transmittance. An increase in the transmittance increases the luminance of a pixel. In other words, an increase in the slit pitch decreases the response speed and increases the luminance of a pixel.

While an increase in the luminance of a pixel due to an increase in the slit pitch decreases the response speed, decreasing the cell thickness can increase the response speed. Thus, it is possible to make the response speeds of the liquid crystals in the respective sub-pixels uniform and increase the luminance of a specific sub-pixel.

As described above, by using the relation between the slit pitch 1, the response time and the luminance of a pixel, and the cell thickness d illustrated in FIG. 24, it is possible to control not only the response speed but also the luminance of a pixel.

Application Examples

Figure 25:
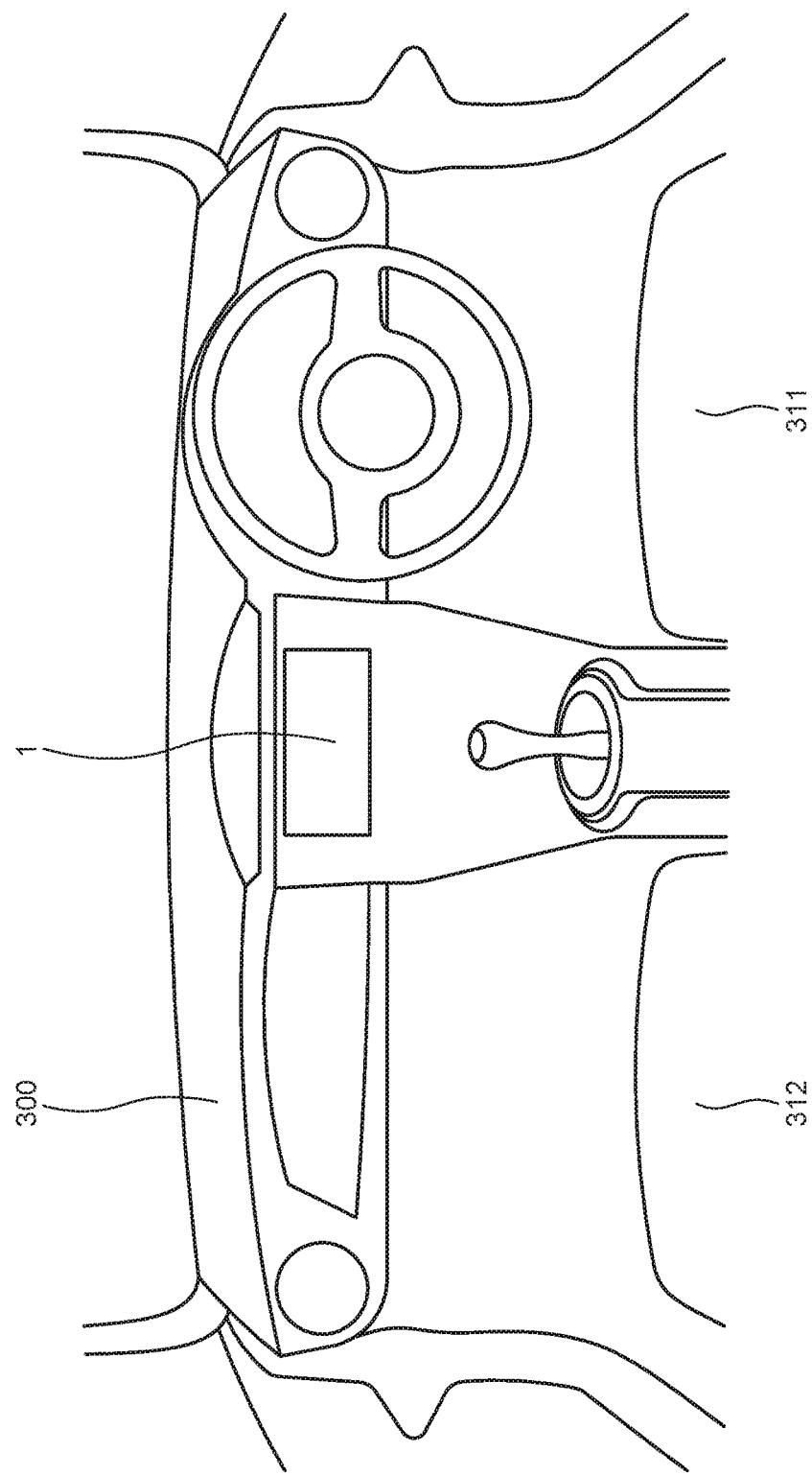
FIG. 25 is a schematic view of an example of an electronic apparatus to which the liquid crystal display device according to the present embodiment is applied.
Figure 26:
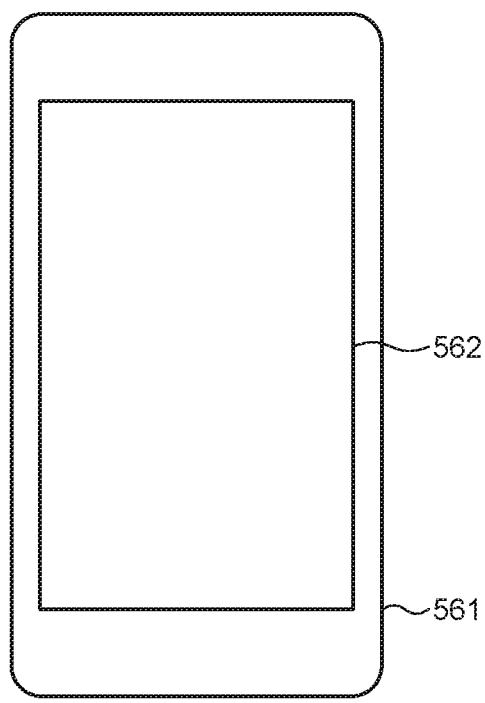
FIG. 26 is a schematic view of an example of an electronic apparatus to which the liquid crystal display device according to the present embodiment is applied.

The following describes application examples of the liquid crystal display device 1 or 1A explained in the first and the second embodiments and the modifications thereof with reference to FIGS. 25 and 26. FIGS. 25 and 26 are schematic views of examples of an electronic apparatus to which the liquid crystal display device according to the present embodiment is applied. The liquid crystal display device 1 or 1A according to the present embodiment is applicable to electronic apparatuses of all fields, such as car navigation systems including the one illustrated in FIG. 25, television apparatuses, digital cameras, notebook personal computers, portable electronic apparatuses including the mobile phone illustrated in FIG. 26, and video cameras. In other words, the liquid crystal display device 1 or 1A according to the present embodiment is applicable to electronic apparatuses of all fields that display video signals received from the outside or video signals generated inside thereof as an image or video. The electronic apparatuses each include the control device 4 (refer to FIG. 1) that supplies video signals to the liquid crystal display device and controls the operation of the liquid crystal display device.

The electronic apparatus illustrated in FIG. 25 is a car navigation apparatus to which the liquid crystal display device 1 or 1A according to the first and the second embodiments and the modifications thereof is applied. The liquid crystal display device 1 or 1A is arranged on a dashboard 300 in a vehicle. Specifically, the liquid crystal display device 1 or 1A is arranged between a driver's seat 311 and a passenger seat 312 on the dashboard 300. The liquid crystal display device 1 or 1A of the car navigation apparatus is used to display navigation information, an operating screen for music, or a reproduced movie, for example.

The electronic apparatus illustrated in FIG. 26 operates as a mobile computer, a multifunctional mobile phone, a mobile computer capable of making a voice call, or a mobile computer capable of performing communications to which the liquid crystal display device 1 or 1A according to the first and the second embodiments and the modifications thereof is applied. The electronic apparatus is a portable information terminal, which may be called a smartphone or a tablet terminal. The portable information terminal includes a display unit 562 on the surface of a housing 561, for example. The display unit 562 includes the liquid crystal display device 1 or 1A according to the first and the second embodiments and the modifications thereof and a touch detecting (what is called a touch panel) function for detecting an external contact object.

The contents described above are not intended to limit the embodiments. The components according to the embodiments above include contents easily conceivable by those skilled in the art and contents substantially identical thereto, that is, what is called equivalents. Various omissions, substitutions, and modifications of the components may be made without departing from the spirit of the invention. The invention may be embodied by the following aspects.

A liquid crystal display device according to an aspect of the present invention includes a first substrate, a second substrate arranged facing the first substrate, a liquid crystal layer arranged between the first substrate and the second substrate, a plurality of pixels arranged in a matrix and each including sub-pixels corresponding to a plurality of different color areas, a first electrode arranged in each of the sub-pixels, and a second electrode arranged at a portion facing the first electrode. The first electrode includes an electrode base portion extending in a first direction and a plurality of comb tooth portions extending in a second direction different from the first direction from the electrode base portion with a certain gap interposed therebetween. A slit pitch of a sub-pixel in one color area and a slit pitch of a sub-pixel in the other color area of at least two color areas out of the different color areas are different in the slit pitch corresponding to a gap between the comb tooth portions adjacent to each other.

According to a preferable aspect, the slit pitch of a sub-pixel in a color area having the highest human visibility out of the different color areas is preferably smaller than the slit pitch of the sub-pixel in the other color area.

According to a preferable aspect, the first substrate includes a plurality of color filters corresponding to the different color areas. A cell thickness is a distance between the second substrate and the color filters. A sub-pixel provided with one color filter of at least two color filters out of the color filters preferably has a cell thickness smaller than that of a sub-pixel provided with the other color filter. The slit pitch of the sub-pixel provided with the one color filter is preferably larger than the slit pitch of the sub-pixel provided with the other color filter.

According to a preferable aspect, values obtained by multiplying the cell thickness by the slit pitch in the respective sub-pixels are preferably substantially equal to one another.

According to a preferable aspect, the first substrate includes the color filters corresponding to the different color areas. The thickness of one color filter of at least two color filters out of the color filters is preferably larger than the thickness of the sub-pixel provided with the other color filter. The slit pitch of the sub-pixel provided with the first color filter is preferably larger than the slit pitch of the sub-pixel provided with the other color filter.

According to a preferable aspect, a cell thickness is a distance between the second substrate and the color filters, and values obtained by multiplying the cell thickness by the slit pitch in the respective sub-pixels are preferably substantially equal to one another.

According to a preferable aspect, the sub-pixels include a first sub-pixel, a second sub-pixel, a third sub-pixel, and a fourth sub-pixel. The first sub-pixel to the fourth sub-pixel represent different color areas. The slit pitch of the fourth sub-pixel is preferably different from the slit pitch of at least one of the first sub-pixel, the second sub-pixel, and the third sub-pixel.

According to a preferable aspect, an electronic apparatus includes any of the above-described liquid crystal display devices and a control device that supplies an input signal to the liquid crystal display device. The control device preferably switches between a three-pixel mode for performing display with the first sub-pixel, the second sub-pixel, and the third sub-pixel, and a four-pixel mode for performing display with the first sub-pixel, the second sub-pixel, the third sub-pixel, and the fourth sub-pixel depending on a response speed required for the input signal.

According to a preferable aspect, the electronic apparatus preferably includes the liquid crystal display device and the control device that supplies the input signal to the liquid crystal display device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device, comprising:
 a first substrate;
 a second substrate arranged facing the first substrate;
 a liquid crystal layer arranged between the first substrate and the second substrate;
 a plurality of pixels arranged in a matrix and each pixel including sub-pixels corresponding to a plurality of different color areas,
 wherein the first substrate includes a plurality of color filters corresponding to the different color areas,
 wherein the sub-pixels each include a sub-pixel cell thickness defined by a distance between the second substrate and the color filters,
 wherein the sub-pixels each include a sub-pixel slit pitch,
 wherein, in each pixel, the sub-pixels include a third sub-pixel, a second sub-pixel, and a first sub-pixel, and
 wherein the third sub-pixel includes a third sub-pixel cell thickness and a third sub-pixel slit pitch, the second sub-pixel includes a second sub-pixel cell thickness and a second sub-pixel slit pitch, and the first sub-pixel includes a first sub-pixel cell thickness and a first sub-pixel slit pitch;
 a first electrode arranged in each of the sub-pixels; and
 a second electrode arranged at a portion facing the first electrode, wherein
 the first electrode comprises:
 an electrode base portion extending in a first direction; and
 a plurality of comb tooth portions extending in a second direction different from the first direction from the electrode base portion with a certain gap interposed therebetween,
 wherein each sub-pixel slit pitch corresponding to a gap between the comb tooth portions adjacent to each other,
 wherein the slit pitch of the third sub-pixel is greater than the slit pitch of at least one of the second sub-pixel and the first sub-pixel, and
 wherein the cell thickness of the third sub-pixel is less than the cell thickness of the same one of the second sub-pixel and/or the same one of the first sub-pixel.

2. The liquid crystal display device according to claim 1, wherein:
the third sub-pixel is a blue sub-pixel,
the second sub-pixel is a green sub-pixel,
the red sub-pixel is a red sub-pixel.

3. The liquid crystal display device according to claim 1, wherein the sub-pixel slit pitch in a color area having a highest human visibility out of the different color areas is smaller than the sub-pixel slit pitch in the other color area.

4. The liquid crystal display device according to claim 1, wherein a color filter thickness of the third sub-pixel is larger than a color filter thickness of the second sub-pixel or the first sub-pixel.

5. The liquid crystal display device according to claim 1, wherein values obtained by multiplying the sub-pixel cell thickness by the sub-pixel slit pitch in the respective sub-pixels are substantially equal to one another.

6. The liquid crystal display device according to claim 4, wherein:
a cell thickness is a distance between the second substrate and the color filters, and
values obtained by multiplying the sub-pixel cell thickness by the sub-pixel slit pitch in the respective sub-pixels are substantially equal to one another.

7. The liquid crystal display device according to claim 1, wherein
the sub-pixels include a fourth sub-pixel that represents a different color area than the third sub-pixel, the second sub-pixel and the first sub-pixel, and
a slit pitch of the fourth sub-pixel is different from at least one of the third sub-pixel slit pitch, the second sub-pixel slit pitch and the first sub-pixel slit pitch.

8. The liquid crystal display device according to claim 7, wherein the liquid crystal display device switches between a three-pixel mode for performing display with the third sub-pixel, the second sub-pixel, and the first sub-pixel, and a four-pixel mode for performing display with the third sub-pixel, the second sub-pixel, the first sub-pixel, and the fourth sub-pixel.

9. The liquid crystal display device according to claim 1, further comprising an orientation film, wherein liquid crystal molecules are aligned in parallel to the second direction.

10. The liquid crystal display device according to claim 1, wherein the liquid crystal display device includes a plurality of the first electrodes including a first-first electrode and a second-first electrode that is adjacent to the first-first electrode.

11. The liquid crystal display device according to claim 10, wherein a tip of the comb tooth portions of the first-first electrode and a tip of the comb tooth portions of the second-first electrode are arranged alternately in the first direction.

12. The liquid crystal display device according to claim 11, wherein the tip of the comb tooth portions of the first-first electrode and the tip of the comb tooth portions of the second-first electrode are alternately opposed to each other.

13. The liquid crystal display device according to claim 7, wherein the fourth sub-pixel is a white sub-pixel or a yellow sub-pixel.

* * * * *